United States Patent

Ikemoto

[11] Patent Number: 5,969,717
[45] Date of Patent: *Oct. 19, 1999

[54] DISPLAY COMPONENT SELECTING SYSTEM AND METHOD

[75] Inventor: Hiroyuki Ikemoto, Kawasaki, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/900,709

[22] Filed: Jul. 25, 1997

[30] Foreign Application Priority Data

Jul. 25, 1996 [JP] Japan ..................... 8-195902
Sep. 17, 1996 [JP] Japan ..................... 8-244455

[51] Int. Cl.$^6$ ....................................... G06F 3/14
[52] U.S. Cl. ................. 345/333; 345/335; 345/342; 345/352; 345/340; 395/704
[58] Field of Search ................. 395/704; 345/333, 345/340, 335, 332, 342, 352

[56] References Cited

U.S. PATENT DOCUMENTS

| | | | |
|---|---|---|---|
| 5,327,529 | 7/1994 | Fults | 345/335 |
| 5,335,320 | 8/1994 | Iwata | 395/704 |
| 5,600,778 | 9/1995 | Swanson | 345/333 |
| 5,651,108 | 7/1997 | Cain | 345/340 |

OTHER PUBLICATIONS

Paradox for Windows, Borland International Inc., 1985–1994, pp. 351,363–364, 1994.

*Primary Examiner*—Raymond J. Bayerl
*Assistant Examiner*—Thomas T. Nguyen
*Attorney, Agent, or Firm*—Banner & Witcoff, Ltd.

[57] ABSTRACT

A display component selecting system comprises unit for inputting a screen input/output data item to be inputted and/or outputted on a display screen and use information representing a use for the data item by at least one attribute, unit, which includes a table showing the correspondence between various attributes and various display components, for holding a selection rule used to select a suitable display component in accordance with the inputted use information, and unit for selecting a display component associated with the inputted screen input/output data item in accordance with the selection rule.

8 Claims, 21 Drawing Sheets

| | 401 | 402 | 403 | 404 | 405 | 406 | 407 | 408 | 409 | 410 | 411 | 412 | 413 FIXED CHOICES | | |
|---|---|---|---|---|---|---|---|---|---|---|---|---|---|---|---|
| | DATA NAME | FUNC-TION | CAP-TION | CHAR-ACTER | DRAW-ING | DIRECT | ONE | PLURAL | ALWAYS | TEMPO-RALLY | FIXED | VARI-ABLE | 413a | 413b | 413c |
| 414 | MATTER OF BUSINESS | | | | | ○ | ○ | | | ○ | ○ | | VISIT TO MEETING | DELIVERY OF GOODS | TRADE |
| 415 | POSITION | | | | | ○ | ○ | | | ○ | ○ | | GENERAL AFFAIRS | DEVELOP-MENT | |
| 416 | LENGTH OF STAY | | | | | ○ | ○ | | | ○ | ○ | | LESS THAN 1 HOUR | LESS THAN 2 HOURS | MORE THAN 3 HOURS |
| 417 | REGIS-TRATION | ○ | | | | | | | | | | | | | |
| 418 | END | ○ | | | | | | | | | | | | | |

FIG. 6A

| VISIT_REGISTER.TXT |
|---|
| MATTER OF BUSINESS, 0, 0, 0, 0, 0, 1, 1, 0, 0, 1, 1, 0, VISIT TO MEETING, DELIVERY OF GOODS POSITION, 0, 0, 0, 0, 0, 1, 1, 0, 0, 1, 1, 0, GENERAL AFFAIRS, DEVELOPMENT, TRADE LENGTH OF STAY, 0, 0, 0, 0, 0, 1, 1, 0, 0, 1, 1, 0, LESS THAN 1 HOUR, LESS THAN 2 HOURS, MORE THAN 3HOURS REGISTRATION, 1, 0, 0, 0, 0, 0, 0, 0, 0, 0, 0, 0, END, 1, 0, 0, 0, 0, 0, 0, 0, 0, 0, 0, 0, |

FIG. 6B

| | 501 | 502 | 503 | 504 | 505 | 506 | 507 | 508 | 509 | 510 | 511 | 512 |
|---|---|---|---|---|---|---|---|---|---|---|---|---|
| | GUI COMPONENT | FUNCTION | CAPTION | CHARACTER | DRAWING | DIRECT | ONE | PLURAL | ALWAYS | TEMPORALLY | FIXED | VARIABLE |
| 513 | Label | | ○ | | | | | | | | | |
| 514 | CommandButton | ○ | | | | | | | | | | |
| 515 | TextBox | | | ○ | | | | | | | | |
| 516 | Image | | | | ○ | | | | | | | |
| 517 | ComboBox | | | | | ○ | ○ | | | | | |
| 518 | ListBox | | | | | ○ | | ○ | | | | |
| 519 | OptionButton | | | | | | ○ | | ○ | | ○ | ○ |
| 520 | CheckBox | | | | | | | ○ | ○ | | ○ | ○ |

| | | |
|---|---|---|
| 521 | Form | ALL OF THE DATA ITEMS |
| 522 | Frame | DATA NAME OF EACH OF TextBox, Image, ComboBox, ListBox OptionButton, AND CheckBox |

FIG. 7

| | 701 | 702 | 703 | 704 | 705 | 706 | 707 |
|---|---|---|---|---|---|---|---|
| | DATA ITEM | COMPONENT | COMPONENT NAME | Height | Left | Top | Width |
| 708 | VISIT REGISTER | Form | P1 | 3535 | 0 | 0 | 3525 |
| 709 | MATTER OF BUSINESS | Frame | P2 | 900 | 100 | 100 | 1700 |
| 710 | VISIT TO MEETING | ComboBox | P3 | 400 | 200 | 400 | 1400 |
| 711 | DELIVERY OF GOODS | | | | | | |
| 712 | POSITION | Frame | P4 | 900 | 100 | 1100 | 1700 |
| 713 | GENERAL AFFAIRS | ComboBox | P5 | 400 | 200 | 400 | 1400 |
| 714 | DEVELOPMENT | | | | | | |
| 715 | TRADE | | | | | | |
| 716 | LENGTH OF STAY | Frame | P6 | 900 | 100 | 2100 | 1700 |
| 717 | LESS THAN 1 HOUR | ComboBox | P7 | 400 | 200 | 400 | 1400 |
| 718 | LESS THAN 2 HOURS | | | | | | |
| 719 | MORE THAN 3 HOURS | | | | | | |
| 720 | REGISTRATION | CommandButton | P8 | 400 | 1900 | 100 | 1400 |
| 721 | END | CommandButton | P9 | 400 | 1900 | 500 | 1400 |

FIG. 9

|  | 801 | 802 | 803 | 804 | 805 |
|---|---|---|---|---|---|
|  | Height | Left | Top | Width | Caption |
| 807—Form | ○ | ○ | ○ | ○ | ○ |
| 808—Label | ○ | ○ | ○ | ○ | ○ |
| 809—CommandButton | ○ | ○ | ○ | ○ | ○ |
| 810—TextBox | ○ | ○ | ○ | ○ |  |
| 811—Image | ○ | ○ | ○ | ○ |  |
| 812—ComboBox | ○ | ○ | ○ | ○ |  |
| 813—ListBox | ○ | ○ | ○ | ○ |  |
| 814—OptionButton | ○ | ○ | ○ | ○ | ○ |
| 815—CheckBox | ○ | ○ | ○ | ○ | ○ |

806
```
FORM
Begin "COMPONENT" "COMPONENT NAME"
  Caption= "DATA NAME"
  Height=
  Left=
  Top=
  Width=
End
```

| COMPONENT | FORM |
|---|---|
| 818—ComboBox | `Sub Form_Load()`<br>`"COMPONENT NAME".AddItem "NAME"`<br>`...`<br>`End Sub` |
| 819—ListBox |  |

```
1  Begin Form P1
2  Caption    = "VISIT REGISTER"
3  Height     = 3535
4  Left       = 0
5  Top        = 0
6  Width      = 3525
7  Begin Frame P2
8  Caption    = "MATTER OF BUSINESS"
9  Height     = 900
10 Left       = 100
11 Top        = 100
12 Width      = 1700
13 Begin ComboBox P3
14 Height     = 400
15 Left       = 200
16 Top        = 400
17 Width      = 1400
18 End
19 End
20 Begin Frame P4
21 Caption    = "POSITION"
22 Height     = 900
23 Left       = 100
24 Top        = 1100
25 Width      = 1700
26 Begin ComboBox P5
27 Height     = 400
28 Left       = 200
29 Top        = 400
30 Width      = 1400
31 End
32 End
33 Begin Frame P6
34 Caption    = "LENGTH OF STAY"
35 Height     = 900
36 Left       = 100
37 Top        = 2100
38 Width      = 1700
39 Begin ComboBox P7
40 Height     = 400
41 Left       = 200
42 Top        = 400
43 Width      = 1400
44 End
45 End
46 Begin CommandButton P8
47 Caption    = "REGISTRATION"
48 Height     = 400
49 Left       = 1900
50 Top        = 100
51 Width      = 1400
52 End
53 Begin CommandButton P9
54 Caption    = "END"
55 Height     = 400
56 Left       = 1900
57 Top        = 500
58 Width      = 1400
59 End
60 End
61 Sub Form_Load ()
62 P3.AddItem "VISIT TO MEETING"
63 P3.AddItem "DELIVERY OF GOODS"
64 P5.AddItem "GENERAL AFFAIRS"
65 P5.AddItem "DEVELOPMENT"
66 P5.AddItem "TRADE"
67 P7.AddItem "LESS THAN 1 HOUR"
68 P7.AddItem "LESS THAN 2 HOURS"
69 P7.AddItem "MORE THAN 3 HOURS"
70 End Sub
```

| | 1601 | 1602 | 1603 | 1604 | 1605 | 1606 |
|---|---|---|---|---|---|---|
| | HIGHEST ORDER GROUP | GROUP | DATA ITEM | INPUT KEYWORD | OUTPUT KEYWORD | IMPORTANT |
| 1607 | VISIT REGISTER | | | | | |
| 1608 | | SELECTION OF FUNCTION | | SELECT FUNCTION | EXECUTE FUNCTION | |
| 1609 | | | INPUT OF REGISTER | | | |
| 1610 | | | PRINTING OF RESULT | | | |
| 1611 | | MATTER OF BUSINESS | | DIRECT INPUT+EXCLUSIVE SELECTION | RESULT OF SELECTION | |
| 1612 | | | VISIT TO MEETING | | | |
| 1613 | | | DELIVERY OF GOODS | | | |
| 1614 | | POSITION | | DIRECT INPUT+EXCLUSIVE SELECTION | RESULT OF SELECTION | |
| 1615 | | | GENERAL AFFAIRS | | | |
| 1616 | | | DEVELOPMENT | | | |
| 1617 | | | TRADE | | | |
| 1618 | | LENGTH OF STAY | | DIRECT INPUT+EXCLUSIVE SELECTION | RESULT OF SELECTION | |
| 1619 | | | LESS THAN 1 HOUR | | | |
| 1620 | | | LESS THAN 2 HOURS | | | |
| 1621 | | | MORE THAN 3 HOURS | | | |
| 1622 | | COMMAND | | SELECT FUNCTION | EXECUTE FUNCTION | ○ |
| 1623 | | | REGISTRATION | | | |
| 1624 | | | END | | | |

FIG. 16A

| REGISTRATION REGISTER | | | | |
|---|---|---|---|---|
| | SELECTION OF FUNCTION | SELECT FUNCTION | EXECUTE FUNCTION | |
| | | INPUT OF REGISTER | | |
| | MATTER OF RESULT | PRINTING OF RESULT DIRECT INPUT + EXCLUSIVE SELECTION | RESULT OF SELECTION | |
| | | DELIVERY OF GOODS | | |
| | POSITION | PRINTING OF RESULT DIRECT INPUT + EXCLUSIVE SELECTION | RESULT OF SELECTION | |
| | | GENERAL AFFAIRS | | |
| | | DEVELOPMENT | | |
| | LENGTH OF STAY | TRADE DIRECT INPUT + EXCLUSIVE SELECTION | RESULT OF SELECTION | |
| | | LESS THAN 1 HOUR | | |
| | | LESS THAN 2 HOURS | | |
| | | MORE THAN 3 HOURS | | |
| | COMMAND | SELECT FUNCTION | EXECUTE FUNCTION | IMPORTANT |
| | | REGISTRATION | | |
| | | END | | |

FIG. 16B

|  | GUI COMPONENT | FORM OF INPUT | FORM OF INPUT AND OUTPUT | OCCUPATION |
|---|---|---|---|---|
| 1705 | Label | DISPLAY ONLY | TITLE AND LABEL | |
| 1706 | CommandButton | SELECT FUNCTION | EXECUTE FUNCTION | LARGE |
| 1707 | Menu | SELECT FUNCTION | EXECUTE FUNCTION | SMALL |
| 1708 | TextBox | DIRECT INPUT | CHARACTERS AND NUMBERS | |
| 1709 | Image | DISPLAY ONLY | PICTURES AND DRAWINGS | |
| 1710 | ComboBox | DIRECT INPUT + EXCLUSIVE SELECTION | RESULT OF SELECTION | SMALL |
| 1711 | ListBox | EXCLUSIVE SELECTION + CANDIDATE VARIABLE | RESULT OF SELECTION | SMALL |
| 1712 | OptionButton | EXCLUSIVE SELECTION + CANDIDATE FIXED | RESULT OF SELECTION | LARGE |
| 1713 | CheckBox | MULTIPLE SELECTION + CANDIDATE FIXED | RESULT OF SELECTION | LARGE |
| 1714 | Form | HIGHEST ORDER GROUP | | |
| 1715 | Frame | DATA NAME OF EACH OF TextBox, Image, ComboBox, OptionButton, AND CheckBox | | |

FIG. 17

|   | 1801 | 1802 | 1803 | 1804 | 1805 | 1806 | 1807 |
|---|---|---|---|---|---|---|---|
|   | DATA | COMPONENT | COMPONENT NAME | Height | Left | Top | Width |
| 1808 | VISIT REGISTER | Form | P1 | 3825 | 0 | 0 | 3525 |
| 1809 | SELECTION OF FUNCTION | Menu | P2 |   |   |   |   |
| 1810 | INPUT OF REGISTER |   | P2_1 |   |   |   |   |
| 1811 | PRINTING OF RESULT |   | P2_2 |   |   |   |   |
| 1812 | MATTER OF BUSINESS | Frame | P3 | 900 | 100 | 100 | 1700 |
| 1813 | VISIT TO MEETING | ComboBox | P4 | 400 | 200 | 400 | 1400 |
| 1814 | DELIVERY OF GOODS |   |   |   |   |   |   |
| 1815 | POSITION | Frame | P5 | 900 | 100 | 1100 | 1700 |
| 1816 | GENERAL AFFAIRS | ComboBox | P6 | 400 | 200 | 400 | 1400 |
| 1817 | DEVELOPMENT |   |   |   |   |   |   |
| 1818 | TRADE |   |   |   |   |   |   |
| 1819 | LENGTH OF STAY | Frame | P7 | 900 | 100 | 2100 | 1700 |
| 1820 | LESS THAN 1 HOUR | ComboBox | P8 | 400 | 200 | 400 | 1400 |
| 1821 | LESS THAN 2 HOURS |   |   |   |   |   |   |
| 1822 | MORE THAN 3 HOURS |   |   |   |   |   |   |
| 1823 | REGISTRATION | CommandButton | P9 | 400 | 1900 | 100 | 1400 |
| 1824 | END | CommandButton | P10 | 400 | 1900 | 500 | 1400 |

FIG. 18

| | Height | Left | Top | Width | Caption |
|---|---|---|---|---|---|
| 1907 Form | O | O | O | O | O |
| 1908 Label | O | O | O | O | O |
| 1909 CommandButton | O | O | O | O | |
| 1910 TextBox | O | O | O | O | |
| 1911 Image | O | O | O | O | |
| 1912 ComboBox | O | O | O | O | |
| 1913 ListBox | O | O | O | O | |
| 1914 OptionButton | O | O | O | O | O |
| 1915 CheckBox | O | O | O | O | O |

1906:
```
FORM
Begin VB. "COMPONENT" "COMPONENT NAME"
  caption= "DATA NAME"
  Height=
  Left=
  Top=
  Width=
End
```

FIG. 19A

1917:
| COMPONENT | FORM |
|---|---|
| 1918 ComboBox | Private Sub Form_Load()<br>"COMPONENT NAME". AddItem "NAME"<br>...<br>End Sub |
| 1919 ListBox | |

FIG. 19B

1920:
| COMPONENT | FORM |
|---|---|
| 1922 Menu | Begin VB.Menu "COMPONENT NAME"<br>  option= "DATA NAME"<br>End |

```
1  Begin VB.Form P1
2    Caption    = "VISIT REGISTER"
3    Height     = 3825
4    Left       = 0
5    Top        = 0
6    Width      = 3525
7    Begin VB.Frame P3
8      Caption  = "MATTER OF BUSINESS"
9      Height   = 900
10     Left     = 100
11     Top      = 100
12     Width    = 1700
13     Begin VB.ComboBox P4
14       Height = 400
15       Left   = 200
16       Top    = 400
17       Width  = 1400
18     End
19   End
20   Begin VB.Frame P5
21     Caption  = "POSITION"
22     Height   = 900
23     Left     = 100
24     Top      = 1100
25     Width    = 1700
26     Begin VB.ComboBox P6
27       Height = 400
28       Left   = 200
29       Top    = 400
30       Width  = 1400
31     End
32   End
33   Begin VB.Frame P7
34     Caption  = "LENGTH OF STAY"
35     Height   = 900
36     Left     = 100
37     Top      = 2100
38     Width    = 1700
39     Begin VB.ComboBox P8
40       Height   = 400
41       Left     = 200
42       Top      = 400
43       Width    = 1400
44     End
45   End
46   Begin VB.CommandButton P9
47     Caption    = "REGISTRATION"
48     Height     = 400
49     Left       = 1900
50     Top        = 600
51     Width      = 1400
52   End
53   Begin CommandButton P10
54     Caption    = "END"
55     Height     = 400
56     Left       = 1900
57     Top        = 600
58     Width      = 1400
59   End
60   Begin VB.Menu P2
61     Caption  = "SELECTION OF FUNCTION"
62     Begin VB.Menu P2_1
63       Caption    = "INPUT OF REGISTER"
64     End
65     Begin VB.Menu P2_2
66       Caption    = "VISIT TO MEETING"
67     End
68   End
69 End
70 Private Sub Form_Load ()
71  P4.AddItem "VISIT TO MEETING"
72  P4.AddItem "DELIVERY OF GOODS"
73  P6.AddItem "GENERAL AFFAIRS"
74  P6.AddItem "DEVELOPMENT"
75  P6.AddItem "TRADE"
76  P8.AddItem "LESS THAN 1 HOUR"
77  P8.AddItem "LESS THAN 2 HOURS"
78  P8.AddItem "MORE THAN 3 HOURS"
79 End Sub
```

DISPLAY COMPONENT SELECTING SYSTEM AND METHOD

BACKGROUND OF THE INVENTION

The present invention relates to a display component selecting system and method, and more particularly to a display component selecting system and method that aid in designing and creating an interactive screen between the computer and the user by GUI (Graphical User Interface).

A GUI builder is often used to design and create GUI. One of GUI builders is UIMS (User Interface Management System) commercially available in the United States. Such a GUI builder is realized using a development tool, such as Visual Basic (a trademark of Microsoft Corporation) or X Window System (a trademark of Massachusetts Institute of Technology).

FIG. 1 shows part of a display screen of Visual Basic that realizes a GUI builder. In the case of an ordinary GUI builder, when designing and preparing a GUI interactive screen, the designer selects icons 111 representing various GUI components (including buttons or lists) from a palette 112 using a mouse for each screen input/output data item that the user inputs or outputs on a display screen. Then, the designer puts the corresponding GUI components 114, 115 in the desired positions in the frame of a window 113. The GUI component is called "control" in Visual Basic. In X Window System, it is called "widget". In the figure, the detailed pattern of each icon has been omitted.

The designer considers a use for each screen input/output data item, selects and positions GUI components, and thereby represents a concrete interactive screen between the computer and the user on the display screen. GUI design and creation using such a GUI builder have encountered the following problems.

A first problem is that because the designer considers the meaning of the screen input/output data item, each time selecting and positioning a GUI component, the working efficiency is low. For example, in the case of GUI components for enabling the user to select only one from a plurality of candidates (items) prepared on the display screen, various types of GUI components can be considered. In an example of FIG. 2, various types of GUI components appear inside the frame of each of Matter of Business 211, Position 212, and Length of Stay 213 on the display screen. Specifically, there are various types of GUI components as follows.

(1) With a first type, a plurality of fixed candidates and corresponding option buttons are displayed. The user is allowed to click the option button corresponding to the desired candidate with a mouse (this type corresponds to OptionButton).

(2) With a second type, a ComboBox including a scroll bar is displayed. The user is allowed to click the scroll bar with a mouse so that the desired one of a plurality of candidates may appear in the Box (this type corresponds to ComboBox).

(3) With a third type, the user is allowed to enter the desired values and characters into the input fields from the keyboard (this type corresponds to TextBox).

In the GUI design and creation, the GUI designer has to take all of the user's possible operations into account and then select suitable ones from the various GUI components and arrange them manually. As a result, errors are liable to occur and the work takes more time and labor than expected, which leads to a low working efficiency.

A second problem is that since interactive screens lacking in the consistency of operation are offered to the user, the user is liable to make a mistake in operation or have difficulty learning how to manipulate the screens.

The GUI design and creation using the GUI builder has the advantage of being able to design a GUI interactive screen easily in such a manner that draws pictures. On the contrary, the advantage raises a third problem: the designer may design and prepare GUI without giving careful consideration to a use for the screen input/output data items to be handled by the GUI, which might lead to later minor adjustments.

In the case of GUI components of the type that allows the user to select one of a plurality of candidates and enter it, a new candidate may be added in the future. Specifically, some of the GUI components have fixed candidates for selection and some allow candidates to be added. When the user is using components for selection from the fixed candidates, being under the impression that the candidate is fixed, the user will encounter the problem of having to make the GUI over when the addition of candidates is needed. In the GUI design and creation using only the GUI builder tools, the designer has to work, taking into account a use for each screen input/output data item handled by the GUI, which exerts a high thinking load on the designer and consequently worsens the working efficiency.

BRIEF SUMMARY OF THE INVENTION

Accordingly, the object of the present invention is to provide a GUI builder capable of designing and creating a GUI interactive screen excellent in operability and maintainability.

The present invention makes it possible to select GUI components from the viewpoint of a use for screen input/output data in building GUI. In the case of the same use, the invention causes the same GUI components to be selected. Specifically, attention is given to the data input and/or output formats of various GUI components. When they are the same, the same GUI components are allocated.

According to a first aspect of the present invention, there is provided a display component selecting system comprising: means for holding the selection rules used to select a suitable display component for a use for a screen input/output data item to be inputted and/or outputted on a display screen; and means for selecting a display component associated with the screen input/output data item in accordance with the selection rules.

According to another aspect of the present invention, there is provided a display component selecting system comprising: means for inputting screen input/output data item to be inputted and/or outputted on a display screen and use information representing a use for the data item; means for holding a selection rule used to select a suitable display component in accordance with the inputted use information; and means for selecting a display component associated with the inputted screen input/output data item in accordance with the selection rule.

According to another aspect of the present invention, there is provided a display component selecting system comprising: means for inputting a screen input/output data item to be inputted and/or outputted on a display screen and use information representing a use for the data item by at least one attribute; means, which includes a table showing the correspondence between various attributes and various display components, for holding the selection rules used to select a suitable display component in accordance with the inputted use information; and means for selecting a display component associated with the inputted screen input/output data in accordance with the selection rules. It is desirable that the selecting means should have means for collating various attributes in the selecting rules with the attribute in the inputted use information.

According to another aspect of the present invention, there is provided a display component selecting system comprising: means for inputting a screen input/output data item to be inputted and/or outputted on a display screen and use information representing a use for the data item by at least one attribute, the inputting means being capable of inputting information indicating importance for the screen input/output data item; means, which includes a table showing the correspondence between various attributes and various display components, for holding a selection rule used to select a suitable display component in accordance with the inputted use information; and means for selecting a display component associated with the inputted screen input/output data item in accordance with the selection rule, wherein the selecting means selects the display component specified to be displayed in the visually emphasized manner in the case where the inputted screen input/output data item indicates importance.

According to another aspect of the present invention, there is provided a display component selecting system comprising: means for inputting a screen input/output data item to be inputted and/or outputted on a display screen and use information representing a use for the data item by at least one attribute, the inputting means being capable of inputting information indicating importance for the screen input/output data item; means, which includes a table showing the correspondence between various attributes and various display components, for holding a selection rule used to select a suitable display component in accordance with the inputted use information, each of the various display components in the table can be specified to be displayed in a visually emphasized manner; and means for selecting a display component associated with the inputted screen input/output data item in accordance with the selection rule, wherein the selecting means selects a display component having higher operability for a user in the case where the inputted screen input/output data item indicates importance.

Each of the above-described systems may further comprise means for generating layout information used to lay out the display components selected by the selecting means on a display screen. In this case, each of the system may further comprise means for generating screen code information from the layout information generated by the layout information generating means on the basis of a specific screen code generation rule.

According to another aspect of the present invention, there is provided a method of selecting a display component to be displayed on a display screen, comprising the steps of: holding the selection rules used to select a suitable display component for a use for a screen input/output data item to be inputted and/or outputted on a display screen; and selecting a display component associated with the screen input/output data item in accordance with the selection rules.

According to another aspect of the present invention, there is provided a method of selecting a display component to be displayed on a display screen, comprising the steps of: inputting screen input/output data item to be inputted and/or outputted on a display screen and use information representing a use for the data item; holding a selection rule used to select a suitable display component in accordance with the inputted use information; and selecting a display component associated with the inputted screen input/output data item in accordance with the selection rule.

According to another aspect of the present invention, there is provided a method of selecting a display component to be displayed on a display screen, comprising the steps of: inputting a screen input/output data item to be inputted and/or outputted on a display screen and use information representing a use for the data item by at least one attribute; having a table showing the correspondence between various attributes and various display components and holding the selection rules used to select a suitable display component in accordance with the inputted use information; and selecting a display component associated with the inputted screen input/output data item in accordance with the selection rules.

According to another aspect of the present invention, there is provided a method of selecting a display component to be displayed on a display screen, comprising the steps of: inputting a screen input/output data item to be inputted and/or outputted on a display screen and use information representing a use for the data item by at least one attribute; inputting information on whether or not the screen input/output data item is of importance; having a table showing the correspondence between various attributes and various display components and holding a selection rule used to select a suitable display component in accordance with the inputted use information; specifying the display components to be displayed in a visually emphasized manner, from among the various display components in the table; and selecting a display component associated with the inputted screen input/output data item in accordance with the selection rule, wherein if the inputted screen input/output data item indicates importance, the display component specified to be displayed in a visually emphasized manner is selected.

According to another aspect of the present invention, there is provided a method of selecting a display component to be displayed on a display screen, comprising the steps of: inputting a screen input/output data item to be inputted and/or outputted on a display screen and use information representing a use for the data item by at least one attribute; inputting information on whether or not the screen input/output data item is of importance; having a table showing the correspondence between various attributes and various display components and holding a selection rule used to select a suitable display component in accordance with the inputted use information; and selecting a display component associated with the inputted screen input/output data item in accordance with the selection rule, wherein if the inputted screen input/output data item indicates importance, a display component having higher operability for a user is selected.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 6A and 6B show examples of the input data items stored in the input data storage unit;

FIG. 7 shows an example of the component selection rules stored in the selection rule storage unit;

FIG. 9 shows an example of data items on components stored in the component data storage unit;

FIGS. 10A and 10B show examples of the screen data generation rules stored in the generation rule storage unit;

FIG. 11 shows an example of the screen data stored in the screen data storage unit;

FIG. 12 is a drawing to help explain a screen created in the first embodiment;

FIGS. 16A and 16B show examples of the data items stored in the input data storage unit;

FIG. 17 shows an example of the component selection rules stored in the selection rule storage unit;

FIG. 18 shows an example of data items on components stored in the component data storage unit;

FIGS. 19A to 19C show examples of the screen data generation rules stored in the generation rule storage unit;

FIG. 20 shows an example of the screen data stored in the screen data storage unit.

DETAILED DESCRIPTION OF THE INVENTION

Hereinafter, referring to the accompanying drawings, embodiments of the present invention will be explained.

First Embodiment

Figure 3:
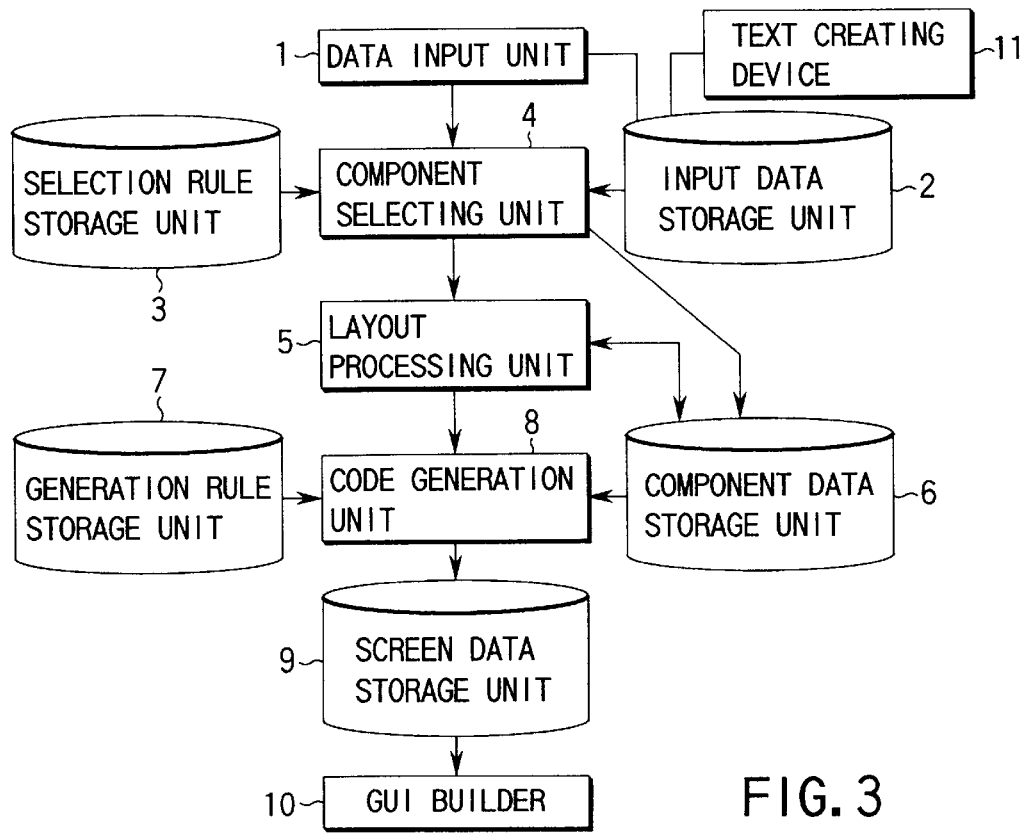
FIG. 3 shows the configuration of a GUI component selecting system according to a first embodiment of the present invention.

FIG. 3 shows the configuration of a GUI component selecting system according to a first embodiment of the present invention. In the figure, a data input unit 1 is used to enter and define data to be inputted and/or outputted on a GUI display screen (hereinafter, referred to as screen input/output data) and information indicating a use for the input/output data (hereinafter, referred to as use information). The screen input/output data and use information entered and defined at the data input unit 1 are stored in an input data storage unit 2.

A selection rule storage unit 3 stores the component selection rules according to which the use information entered from the data input unit 1 is caused to correspond to a GUI component.

Reading not only the screen input/output data and use information stored in the input data storage unit 2 but also the component selection rules from the selection rule storage unit 3, a component selecting unit 4 selects a suitable GUI component for each data item stored in the input data storage unit 2 on the basis of the component selection rules. The selection result (selected GUI component) is sent to an layout processing unit 5 and a component data storage unit 6.

The layout processing unit 5 calculates the position on the GUI display screen of the screen input/output data item for which the GUI component has been selected at the component selecting unit 4, lays out the GUI component in the window, and sends the result (the display position of the GUI component) to the component data storage unit 6. The component data storage unit 6 stores the selected GUI component and its display position for each screen input/output data item.

A generation rule storage unit 7 stores the code conversion rules for converting information on the GUI components and their display positions stored in the component data storage unit 6 into codes that a GUI builder 10 can read.

A code generating unit 8 not only reads the GUI component selected so as to correspond to each data item entered or outputted on the GUI display screen and its display position from the component data storage unit 6 but also reads the code generation rules from the generation rule storage unit 7, and generates codes for screen data items used in the GUI builder 10. The generated codes are sent to a screen data storage unit 9, which stores them.

The GUI builder 10 can be realized using an existing development tool (e.g., Visual Basic) for helping the creation of GUI. A text creating device 11 is an existing text creating tool capable of creating a text file as the result of work. For example, a text editor may be used as the text creating device.

Next, the processing operation of the GUI component selecting system according to the first embodiment will be explained in detail.

Figure 12:
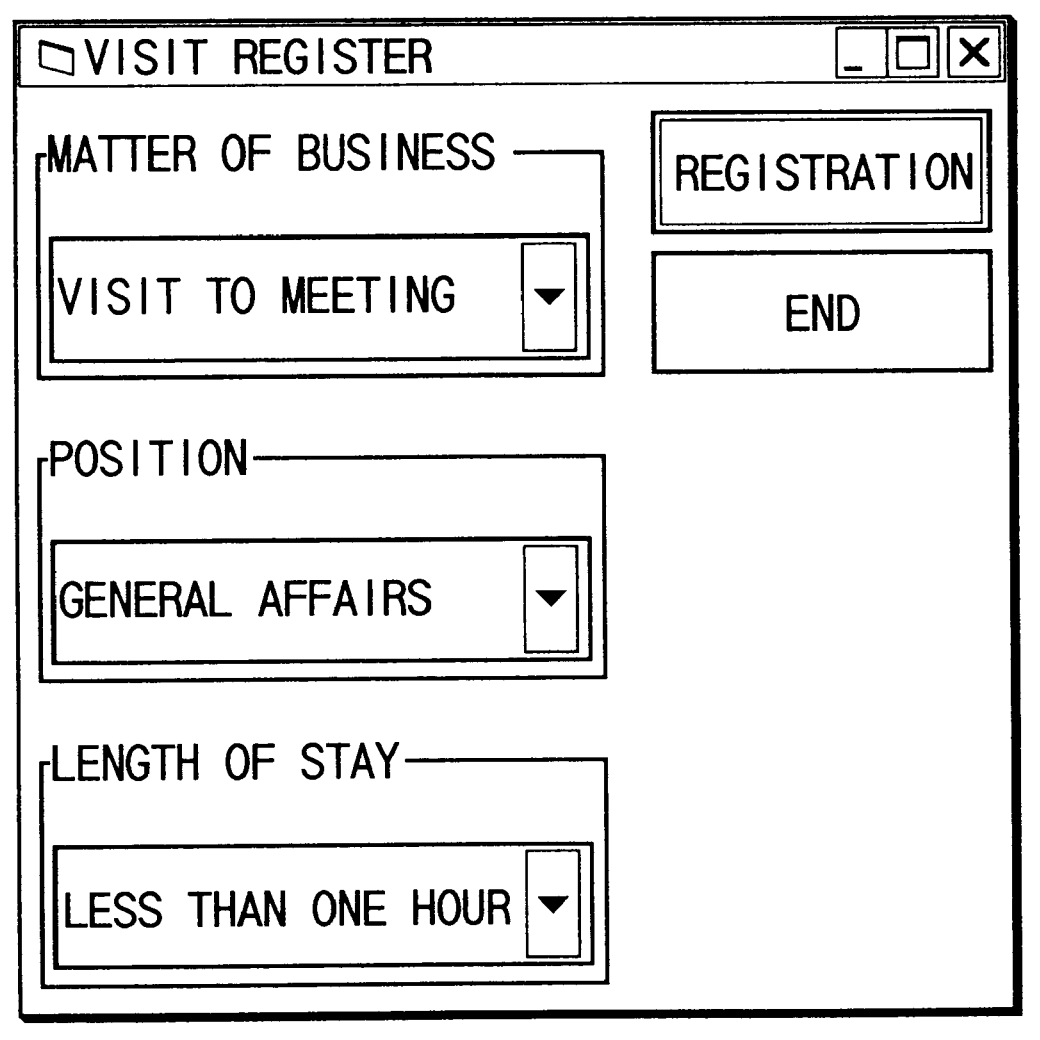

Explanation will be given using an example of a screen in FIG. 12. In the embodiment, the GUI builder is assumed to be realized by using Visual Basic.

Figure 4:
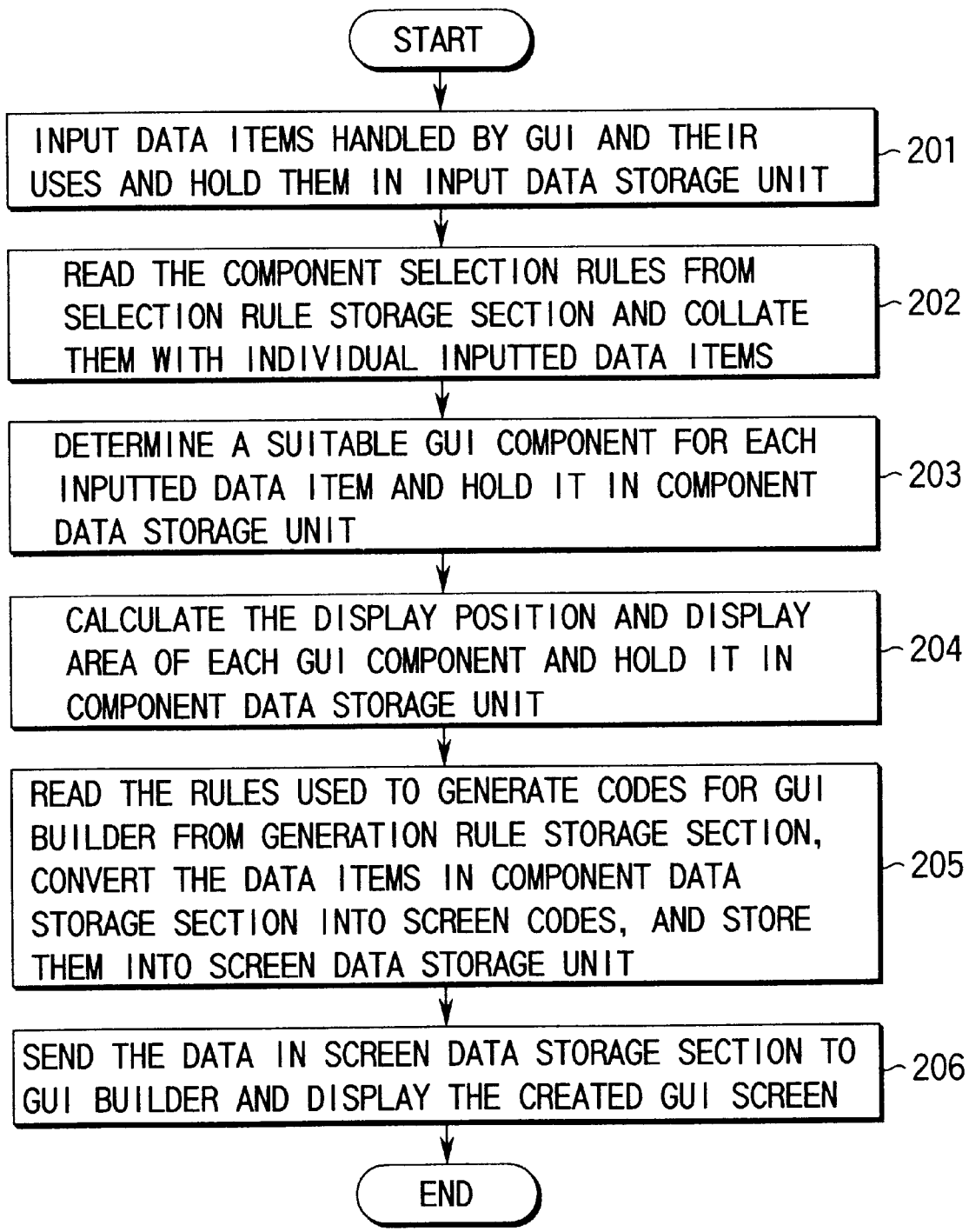
FIG. 4 is a flowchart for the processing of the GUI component selecting system of the first embodiment.

FIG. 4 is a flowchart to help explain the processing operation of the GUI component selecting system.

Figure 2:
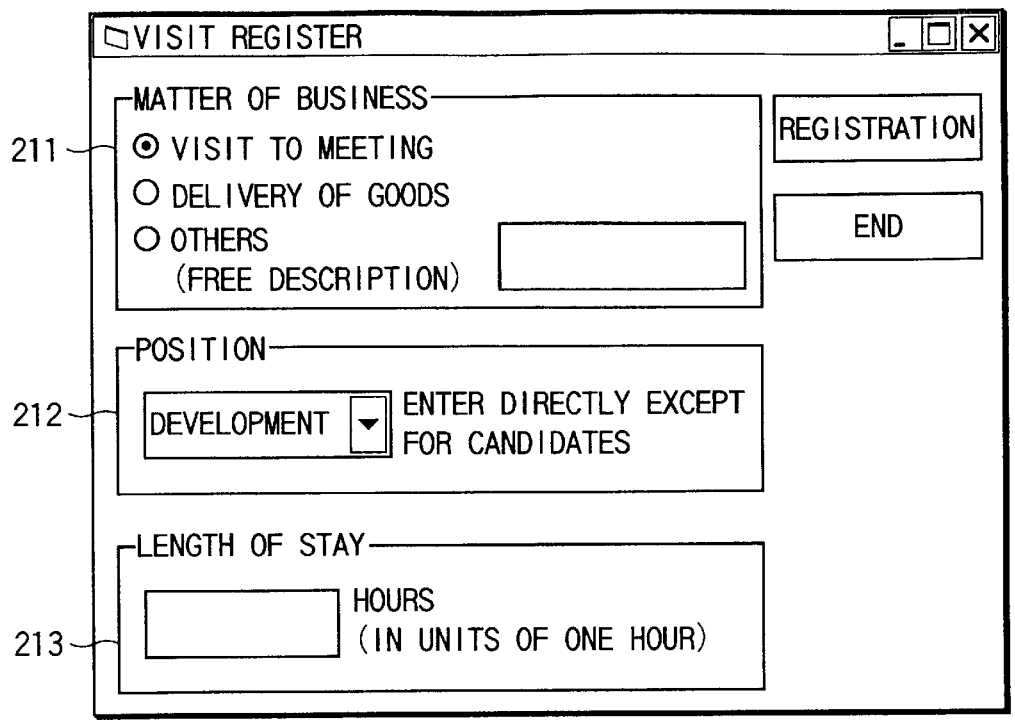
FIG. 2 shows an example of a poor screen lacking in consistency.
Figure 5:
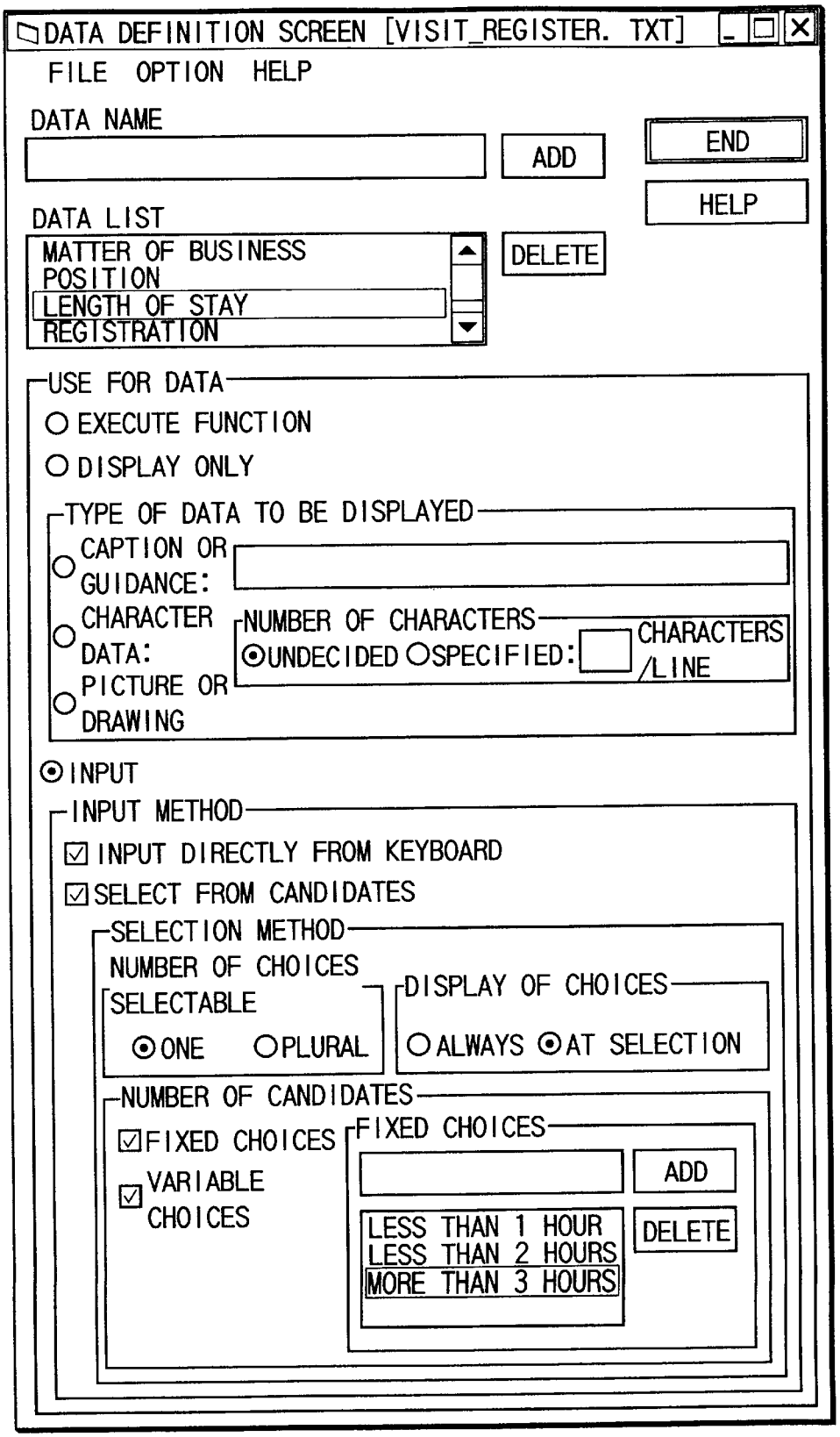
FIG. 5 shows an example of a data definition screen used in the first embodiment.

First, the user enters a screen input/output data item and its use information from the data input unit 1 (STEP 201). FIG. 5 shows an example of the display screen offered by the data input unit 1. As shown in an example of the screen of FIG. 2, in the case of a screen for registering a log of visitors, screen input/output data items inputted or outputted by GUI can be considered as follows.

Matter of Business: one of the choices {Visit to Meeting, Delivery of Goods} is selected or a totally new matter of business is entered Position: one of the choices {General Affairs, Development, Trade} is selected or a totally new position is entered Length of Stay: time is selected from the practical range from 1 to 3 hours, as inputted in units of one hour, or a new time is entered Registration: the function of storing the entered data is called up End: the process of terminating the GUI is called up Of the above data items, in selecting and inputting one of the candidates, the choices need not be displayed constantly.

They have only to be displayed only when the user selects one from the candidates. The procedure for entering the data items with such a use on the data definition screen of FIG. 5 will be explained. All of the three data items, "Matter of Business", "Position", and "Length of Stay" have the same definition method, so only the procedure for defining "Length of Stay" will be explained.

First, as a data name, "Length of Stay" is inputted into a data name input field, and "Add" button is pressed. Then, "Length of Stay" is added in a list box for "Data List" and the contents related to "Use for Data" are allowed to be entered.

Of the items of "Use of Data", the option button "Enter" is turned on. Regarding an input method in this case, a totally new candidate may be added or one of the existing candidates may be selected. In the embodiment, because a new candidate is to be inputted and a candidate is to be selected, the check button "Direct Input from Keyboard" is turned on and the check button "Select from Candidates" is turned on.

Then, a selection related to "Selection Method" is made. Since only one can be selected from the candidates, the option button "One" of the two items in "Number of Selectable Candidates" is turned on. Since the choices have only to be displayed at the time of selection, the option button "In selection" of two items in "Display of Choices" is turned on. Because one of the fixed candidates of one to three hours is to be inputted, the check button "Fixed Choices" in "Number of Candidates" is turned on. In the future, candidates may be added or changed, so the check button "Changeable Choices" is also turned on. Since it is desired that regarding "Fixed Choices", choices should be in the range from one to three hours, "Less than 1 Hour" is entered into the input field in "Fixed Choices" and "Add" button is pressed. This causes the contents of the fixed choice to appear in the list box in "Fixed Choices". The same is true for "Less than 2 Hours" and "More than 3 Hours".

Next, the procedure for defining "Registration" will be explained. When "Registration" is entered into the data name input field as data name and the "Add" button is pressed, "Registration" is added in the list box of "Data List", which enables "Use for Data" to be inputted. "Registration" is used to call up the function of storing the inputted data, so the option button "Execute Function" of the items in "Use for Data" is turned on.

As for "End", the procedure is the same as in defining "Registration", so explanation of it will not be given. After all of "Dana Name" and "Use for Data" have been entered, the "End" button is pressed. After the operation of "End" button has caused the process of giving a caption to the inputted data item and "Visit Register" has been assigned as a caption, the inputted screen input/output data (including "Data Name") and use information (including "Use of Data") have been stored in the input data storage unit 2. FIGS. 6A and 6B are created by the above-described operation and show examples of the screen input/output data and use information stored in the input data storage unit 2.

As long as the data shown in FIGS. 6A and 6B are created, the data input unit 1 does not necessarily have an interactive interface as shown in FIG. 5. Another method of storing the contents as shown in FIGS. 6A and 6B in the input data storage unit 2 is to use the existing text creating device 11, such as a text editor.

In FIG. 4, after the input data (the screen input/output data and use information) has been stored from the data input unit 1 into the input data storage unit 2, the component selecting unit 4 reads not only the input data (the screen input/output data and use information) defined at STEP 201 from the input data storage unit 2 but also the component selection rules from the selection rule storage unit 3, and collates the rules with the respective input data items (STEP 202). The data input unit 1 sends an instruction to select components to the component selecting unit 4. The component selecting unit 4 reads not only the previously defined input data from the input data storage unit 2 but also the component selection rules used to force the GUI components to correspond to uses for the screen input/output data items from the selection rule storage unit 3.

FIG. 7 is a table of the component selection rules used to force the GUI components (component names) to correspond to uses for the screen input/output data items stored in the selection rule storage unit 3. A use for each data item is expressed by various attributes related to the data item. The component selection rules in the figure indicate that as for the attribute "Function", CommandButton is selected as a GUI component, and as for the attribute "Caption", Label is selected as a GUI component. In the figure, the symbol ○ assigned in a manner that extends over more than one attribute (column) in the rows of ComboBox and ListBox means that either of them has only to hold.

The component selecting unit 4 compares with each row of the data definitions stored in the input data storage unit 2 with each row of the component selection rules and forces the data item and GUI component for which their attributes coincide with each other to correspond to one another.

Figure 8:
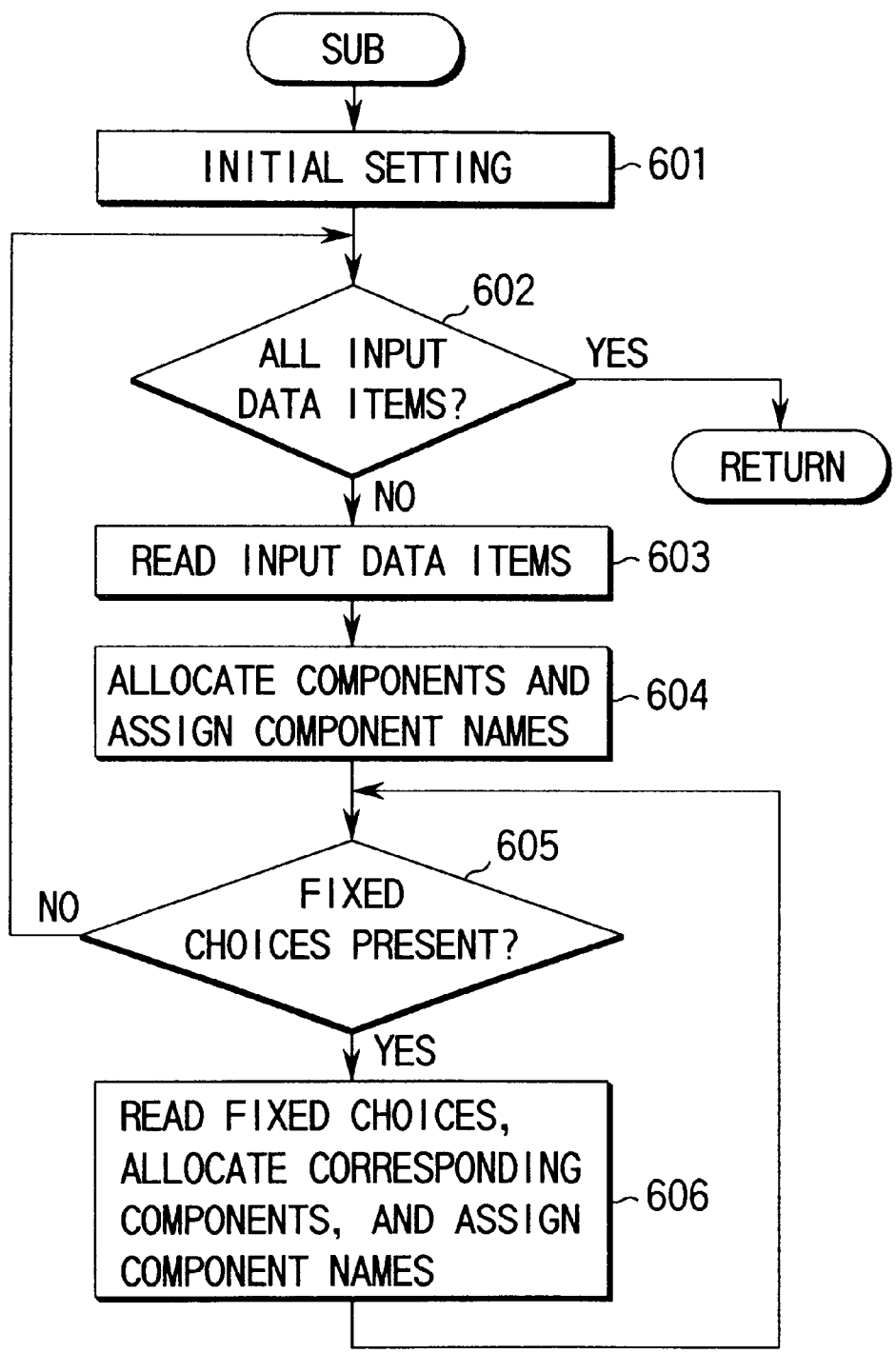
FIG. 8 is a flowchart to help explain the process of selecting components at the component selecting unit.

Then, the component selecting unit 4 determines a suitable GUI component for each input data item and stores the resulting component data item in the component data storage unit 6 (STEP 203). This operation will be described in further detail by reference to FIG. 8.

Specifically, as shown in the figure, in the initial setting, the variables and data items necessary for the operation are set (STEP 601). Then, it is determined whether or not all of the inputted data items have been read (STEP 602). Because nothing has been processed yet, control proceeds to STEP 603. "Visit Register", the name for all of the data items stored in the input data storage unit 2, is acquired (STEP 603). All of the data items are allocated to Form, a window, in accordance with the component selection rules 521 stored in the selection rule storage unit 7 of FIG. 7, the data name (column 701) "Visit Register" and the component (column 702) "Form" are written into the begin row (row 709) in the component data storage unit 6, and "P1" is written into the component name (column 703) (STEP 604) because it is the first data item to which a component has been allocated.

Next, it is determined whether the read-out input data item has the fixed choices (STEP 605). In this case, the input data item has no fixed choice, control returns to STEP 602. At STEP 602, similarly, it is determined whether all of the input data items have been processed, the data item "Matter of Business" in the first row stored in the input data storage unit 2 is acquired (STEP 603), and it is determined using the component selection rules 517 stored in the selection rule storage unit 7 that the data item falls under ComboBox. When a data item is allocated to ComboBox in accordance with the component selection rules 522, the data name is allocated to Frame, a group representation of components. The data name (column 701) "Matter of Business" and the component (line 702) "Frame" are written into the second row (row 710) in the component data storage unit 6 of FIG. 9, and the component name (column 703) "P2" is written because it is the data item to which a component has been allocated secondly (STEP 604).

Because "Matter of Business" has the fixed choices (STEP 605), the fixed choices "Visit to Meeting" and "Delivery of Goods" attached to the data item "Matter of Business" in the first row stored in the input data storage unit 2 are assigned to fixed choices of one ComboBox. The data name (column 701) "Visit to Meeting" and component (column 702) "ComboBox" are written into the third row (row 711) in the column data storage unit 6 of FIG. 8, and the component name (column 703) "P3" is written because it is the data to which a component has been allocated thirdly (STEP 606). The next fixed choices "Delivery of Goods" and "Visit to Meeting" undergo similar processes. Specifically, the data name (column 701) "Delivery of Goods" and the component (line 702) "ComboBox" are written into the fourth row (row 712) in the component data storage unit 6 of FIG. 9, and the component name (column 703) "P3" is written because it is the data item for which a component identical with "Visit to Meeting" has been allocated in the third place (STEP 605 to STEP 606).

Regarding the operation of the component selecting unit 4, the operation of processing "Position" stored secondly into the input data storage unit 2 and the third data item "Length of Stay" is the same as that of the first data item "Matter of Business", so explanation of it will not be given. Next, the operation of processing the fourth data item "Registration" stored in the input data storage unit 2 will be explained.

The component selecting unit 4 acquires the fourth data item "Registration" stored in the input data storage unit 2 (STEP 603) and determines in accordance with the component selection rules 514 stored in the selection rule storage unit 7 of FIG. 7 that the data item falls under CommandButton. Then, the component selecting unit writes the data name (column 701) "Registration" and the component (column 702) "CommandButton" into the thirteenth row (row 621) in the component data storage unit 6 of FIG. 9 and then writes the component name (column 703) "P8" because it is the data item to which a component has been allocated eighthly (STEP 604).

Regarding the operation of the component selecting unit 4, the operation of processing the data item "End" stored fifthly into the input data storage unit 2 is the same as that of the fourth data item "Registration", so explanation of it will not be given.

As a result of the above-described operation of the component selecting unit 4, data items are stored into column 701 to column 703 in each of row 709 to row 722 in the component data storage unit 6.

After the allocation of GUI components has ended in FIG. 4, the component selecting unit 4 sends an instruction to start layout to the layout processing unit 5 after completing the selection of components. The layout processing unit 5 reads data items one after another from the component data storage unit 6, determines the size and position of the GUI component allocated to each data item, and sends them to the component data storage unit 6 (STEP 204 of FIG. 4).

First, the layout processing unit 5 determines general components (CommandButton, TextBox, Image, ComboBox, ListBox, OptionButton, CheckButton), component-arranging components (Frame), and windows (Form) in that order. For example, layout processing is effected, provided that a general component has a height of 400 pixels and a width of 1400 pixels.

General components included in the component data storage unit 6 include ComboBox used for the data items "Visit to Meeting" and "Delivery of Goods", ComboBox used for the data items "General Affairs Department", "Development Department", and "Trade Department", ComboBox used for the data items "Less Than 1 Hour", "Less Than 2 Hours", and "More Than 3 Hours", CommandButton used for the data item "Registrtion", and CommandButton used for the data item "End". The layout processing unit 5 writes, for example, 400 and 1400 into the Width and Height of each of the aforementioned components in the component data storage unit 6.

The layout processing unit 5 determines the size of a component (Frame) for arranging components.

Components for arranging components included in the component data storage unit 6 are Frames used for the data items "Matter of Business", "Position", and "Length of Stay". Because each of these Frames has one ComboBox of the same shape in it, the three data items have the same size. The layout processing unit 5 sets the size of a component for arranging components to the size obtained by adding, for example, a height of 500 pixels and a width of 300 pixels to the size of the display area of all the components included. Because the size of a ComboBox included in these Frames has a height of 400 pixels and a width of 1400 pixels, 900 pixels and 1700 pixels are written into the Width and Height of the Frame of each of the three data items in the component data storage 6, respectively.

Then, the layout processing unit 5 determines the display position of components. After positioning the components except for windows (Forms) and buttons (CommandButtons) in the order of registration, the layout processing unit 5 determines the display position of a button, and finally determines the size and display position of a window. The layout processing unit 5 also makes calculations, provided that the distance between a window frame and a component is 100 pixels, and the height distance between components is 300 pixels and the width distance between components is 100 pixels.

The layout processing unit 5 sets the display position of the Frame for the first non-window data item "Matter of Business" in the component data storage unit 6 at a position 100 pixels apart from the top left of the window, that is, a height (Top) margin of 100 pixels and a width (Left) margin of 100 pixels, and writes them into the component data storage unit 6.

The display position of the ComboBoxs for the next non-window data items "Visit to Meeting" and "Delivery of Goods" has a height (Top) margin of 400 pixels, a place 400 pixel apart from the frame of the Frame for "Matter of Business" in the direction of height and a width (Left) margin of 200 pixels, a place 200 pixels apart from the frame of the Frame for "Matter of Business" in the direction of width. The layout processing unit 5 determines the height (Top) margin and width (Left) margin of the ComboBox for "Visit to Meeting" and "Delivery of Goods" to be 400 and 200 pixels, respectively, and stores them into the component data storage unit 6. The remaining two Frame and ComboBox undergo the same processes as described above, so explanation of them will not be given.

Next, the process of determining the display position of the CommandButton for the remaining non-window data item "Registration" will be explained. The layout processing unit 5 arranges the CommandButtons at the left end of the window from the top vertically.

In the layout processing unit 5, the button data items in the component data storage unit 6 are "Registration" and "End". Regarding the display position of the CommandButton, the position obtained by adding 100 to the one with the largest width (Left+Width) of the components whose display position has been determined is determined to be a width (left) margin. Because the widest components include the Frames for "Matter of Business", "Position", and "Length of Stay" and the sum of Left and Width is 1800 for all the Frames, 1900 is determined to be the width (Left) margin of "Registration" and "End" and is written into the component data storage unit 6. Since "Registration" is at the topmost position in the direction of height, the height (Top) margin is 100, a place 100 pixels apart from the frame of the window. "End" has a height (Top) margin of 500, a place 400 pixels apart from the bottommost of "Registration". These two margins are written into the component data storage unit 6.

The layout processing unit 5 further determines the size and display position of the window.

With the layout processing unit, the display position of a window is the top left of the display screen. The display position of the Frame, the window of "Visit Register", is determined to have a height (Top) margin of 0 and a width (Left) margin of 0. These values are written into the component data storage unit 6. In the layout processing unit, the size of the window is determined to a size obtained by adding a height of 535 pixels and a width of 255 pixels to the size of the display area of all the components included. Because it is found from the locations of the non-window data items and their size in the component data storage unit 6 that the display area of non-widow data items has a height of 3000 pixels and a width of 3300 pixels, the size of the window for "Visit Register" has a width of 3535 and a height of 3525. These values are written into the component data storage unit 6. As a result of the operation of the layout processing unit 5, the pieces of information as shown in FIG. 9 are stored in the component data storage unit 6.

After having completed the above processes, the layout processing unit 5 reads the rules used to generate codes for the GUI builder from the generation rule storage unit 7, converts the data items stored in the component data storage unit 6 into screen codes, and stores the screen codes into the screen code storage unit 9 (STEP 205 of FIG. 4).

Specifically, after having ended the processing, the layout processing unit 5 sends an instruction to generate screen data codes that the GUI builder can read to the code generating unit 8. The code generating unit 8 not only reads the code generation rules from the generation rule storage unit 7 but also the data items on the GUI components from the component data storage unit 6 one after another, then generates screen data codes that the GUI builder 10 can read, and writes the generated codes into the screen data storage unit 9. In the embodiment, the generation rule storage unit 7 stores the generation rules as shown in FIGS. 10A and 10B. Specifically, all the components are written in a format indicated by numeral 806 in FIG. 10A. For Form, Label, CommandBox, OptionButton, and CheckButton, the name of a data item is written as Caption. For ComboBox and ListBox, a data name is written in a format indicated by numeral 817 in FIG. 10B.

The first data item that the code generating unit 8 reads from the component data storage unit 6 is the Form "Visit Register". According to the generation rules, it is converted into the codes from the first row to the sixth row in the generated codes shown in FIG. 10A. The code generating unit 8 generates codes as described above and writes the codes into the screen data storage unit 9 in sequence. Explanation of the processes from this point on will be omitted, because their operation can be understood easily from the generation rules and the contents of the component data storage unit 6. The data items of "Visit Register" generated by the operation of the code generating unit 8 and stored in the screen data storage unit 9 are shown in FIG. 11.

Figure 1:
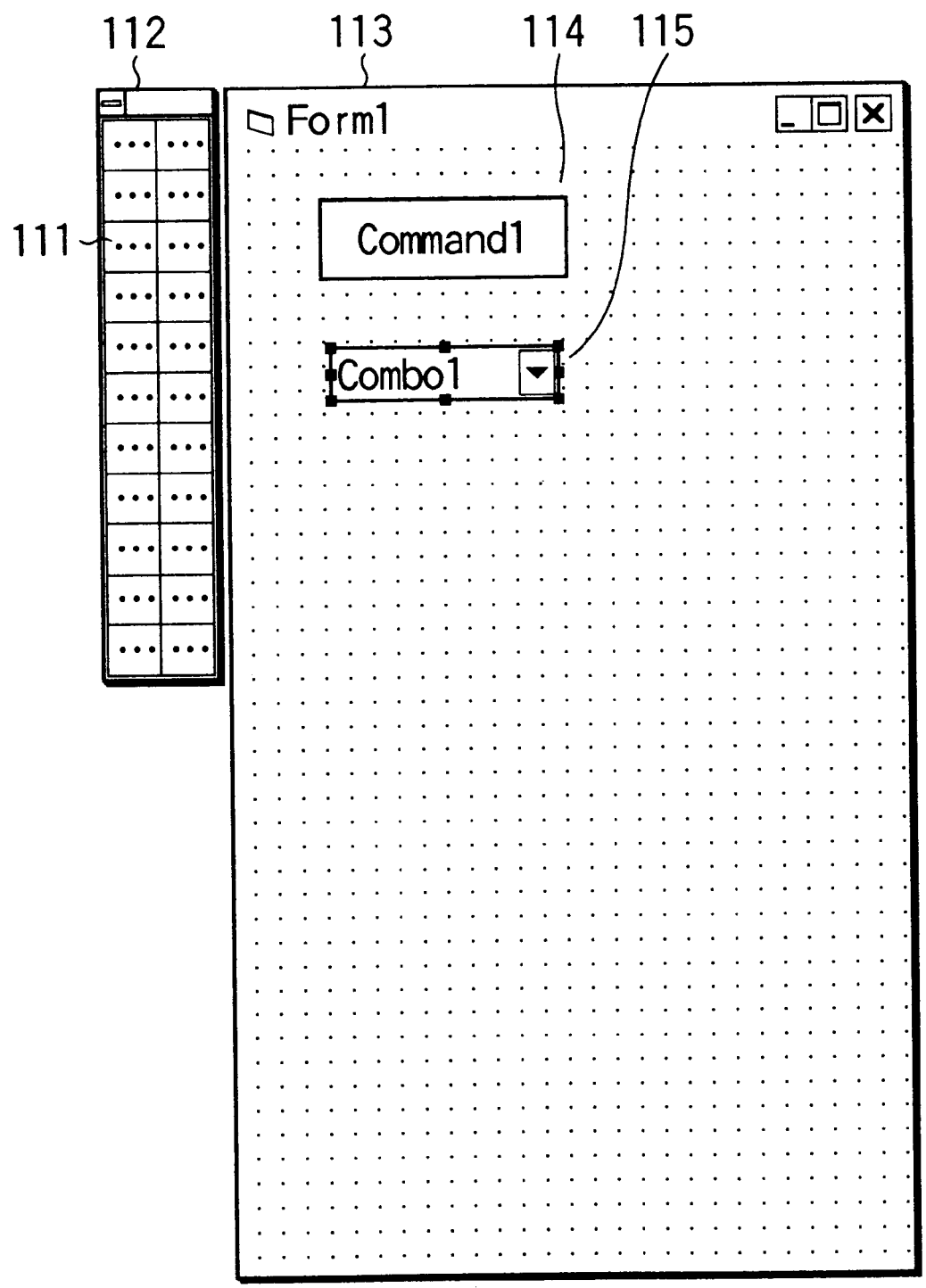
FIG. 1 shows part of a display screen of a development tool realizing a GUI builder.

After the screen data has been created by the above-described processing, the GUI builder 10 reads the data from the screen data storage unit 9, and displays a GUI screen as shown in FIG. 1 (STEP 206).

With the GUI component selecting system of the first embodiment, writing the names and uses for screen input/output data items handled by GUI in specific formats enables a GUI component to be selected automatically and a data item in a format editable by the GUI builder to be generated. Therefore, data items for the same use are selected as the same GUI component, which realizes GUI consistent in operation. Furthermore, before the design of GUI interactive screens, a use for screen input/output data items dealt with by GUI can be examined, which alleviates a working load on the designer in designing and creating GUI interactive screen excellent in operability and maintainability and provides GUI easy for the computer user to use.

Second Embodiment

A second embodiment of the present invention will be explained.

Figure 13:
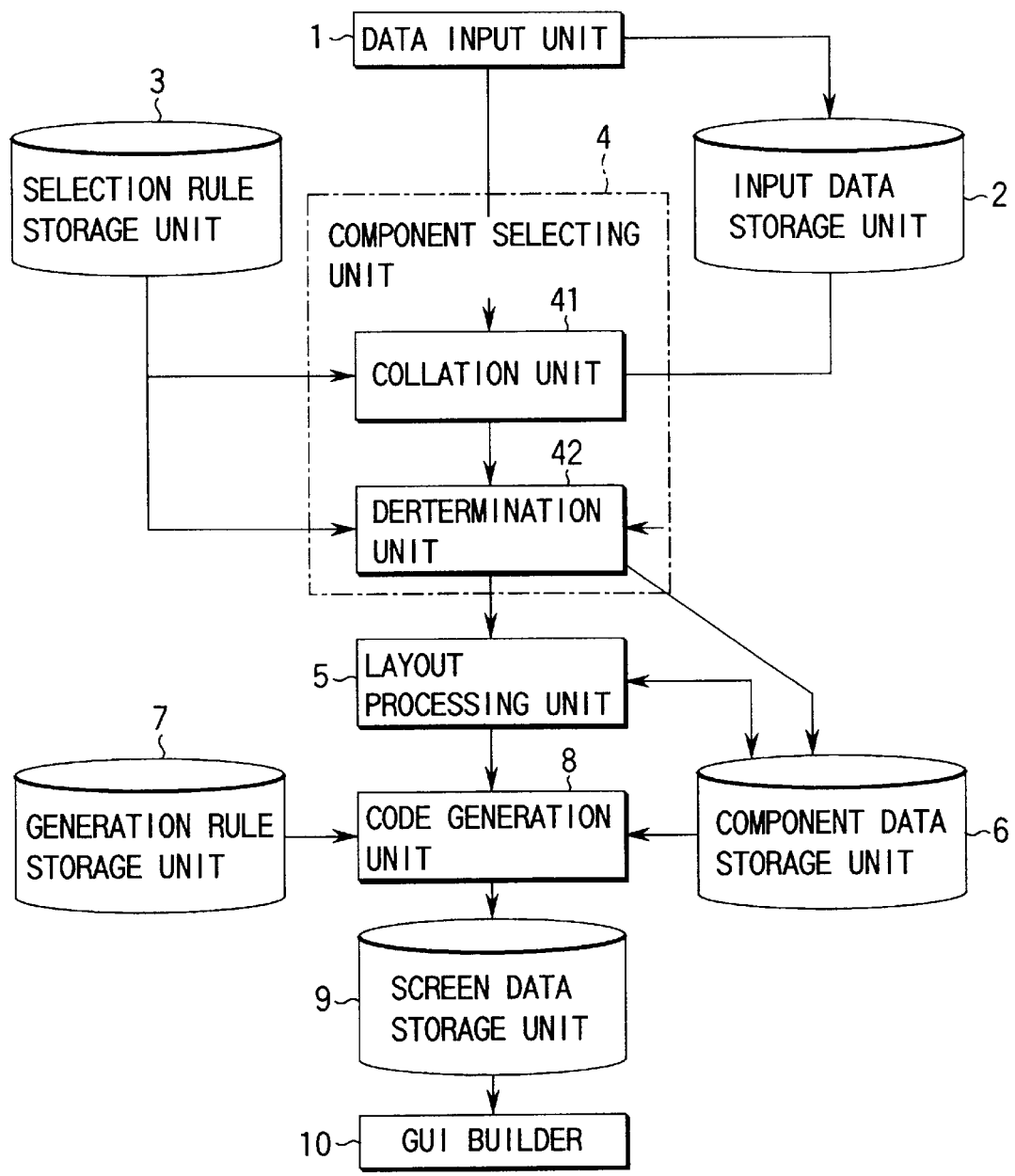
FIG. 13 shows the configuration of a GUI component selecting system according to a second embodiment of the present invention.

FIG. 13 shows the configuration of a GUI component selecting system according to a second embodiment of the present invention. In the figure, a data input unit 1 is used to define and enter screen input/output data items, the relationship between them, the features of them, and the nature of them.

An input data storage unit 2 holds various types of data items defined and inputted at the data input unit 1.

A selection rule storage unit 3 stores the component selection rules used to cause the relationship between screen input/output data items, their features, and characteristics to correspond to suitable GUI components.

A component selecting unit 4 is composed of a collation unit 41 and a decision unit 42. The collation unit 41 reads not only the various types of data items stored in the input data storage unit 2 but also the component selection rules from the selection rule storage unit 3, and selects a candidate for a suitable GUI component in accordance with the component selection rules for each of the data items stored in the input data storage unit 2. Then, when a single screen input/output data item has a plurality of GUI component candidates sent from the collation unit 41, the decision unit 42 reads the component selection rules from the selection rule storage unit 3, and determines one GUI component candidate from the data characteristics held in the input data storage unit 2, and then stores the GUI component selection results for all the screen input/output data items into a component data storage unit 6.

Next, the processing operation of the GUI component selecting system according to the second embodiment will be explained in detail.

The GUI builder in the GUI component selecting system of the second embodiment is assumed to be realized by using Microsoft Visual Basic, for example.

In the following explanation of the processing operation, for example, it is assumed that GUI related to the management of a register of visitors that has the following specifications is designed and created.

A visitor can enter and register a matter of business, position, and length of stay explained later.

Regarding a matter of business, either visit to meeting or delivery of goods is selected or a totally new matter of business is entered.

Regarding a position, any one of general affairs department, development department, and trade department is selected or a totally new position is entered.

Regarding the length of stay, any one of 1, 2, and 3 hours is selected or a new time is entered.

The operation of selecting either the process of registering in a book or the function of printing the result of registering in the book can be effected.

The operation of ending GUI can be effected.

In designing and creating GUI according to the above specifications, data items treated as GUI include the following, for example:

Selection of Function: registration in book, printing of results

Matter of Business: visit to meeting, delivery of goods

Position: general affairs department, development department, trade department

Length of Stay: less than 1 hour, less than 2 hours, more than 3 hours

Command: registration, end

In the processing operation of the GUI component selecting system according to the second embodiment, it is assumed that regarding the above example of data items, the data group of registration and end indicating the execution of a command is used more frequently and is more important than the data group of registration in book and printing of results indicating the selection of a function.

The processing operation of the GUI component selecting system according to the second embodiment will be explained.

Figure 14:
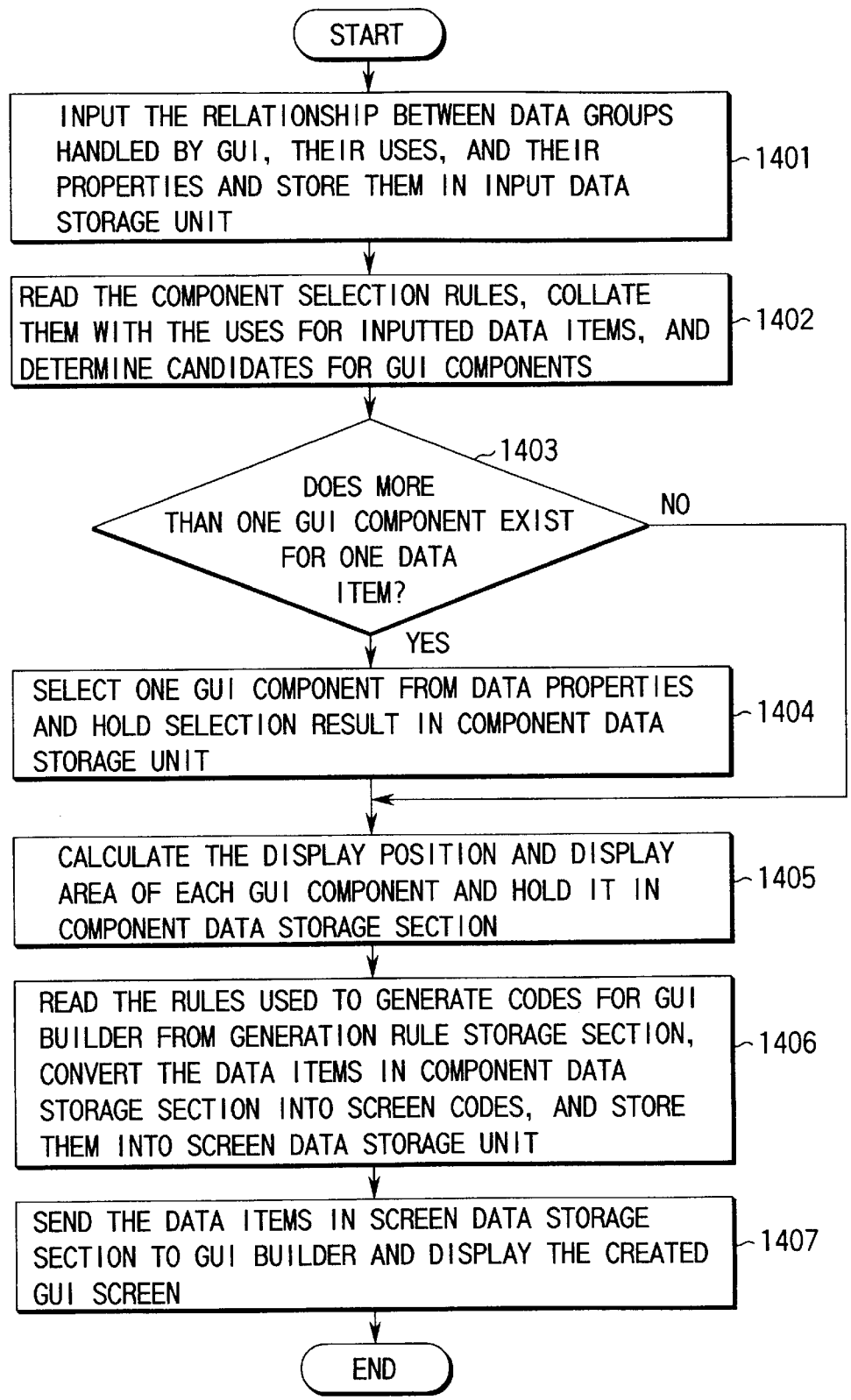
FIG. 14 is a flowchart for the processing of the GUI component selecting system of the second embodiment.

FIG. 14 is a flowchart to help explain the processing operation of the GUI component selecting system according to the second embodiment.

First, the GUI component selecting system takes in screen input/output data items dealt with by GUI, information on their uses, and values based on the degree of importance of the data items and the frequency of use of them, and holds these in the input data storage unit 2 (STEP 1401).

Figure 15A:
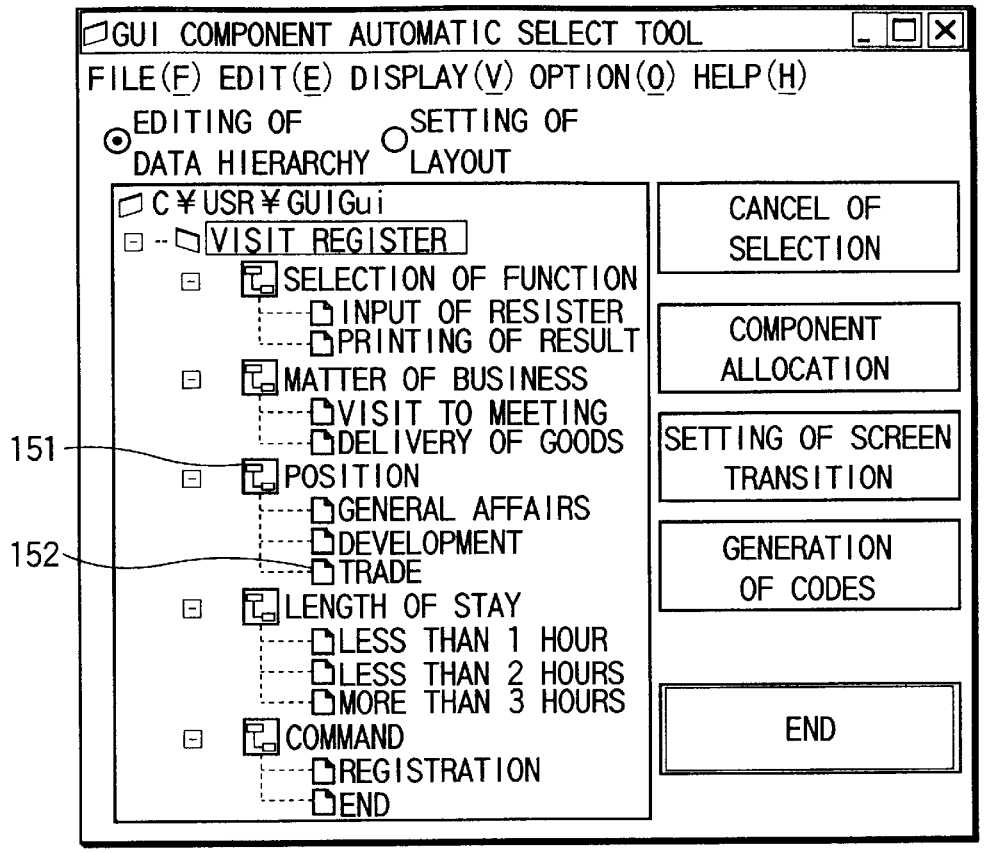
FIGS. 15A to 15C show examples of data definition screens used in the second embodiment.
Figure 15B:
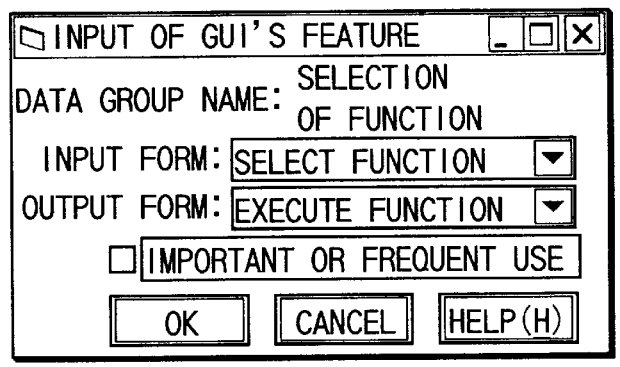
Figure 15C:
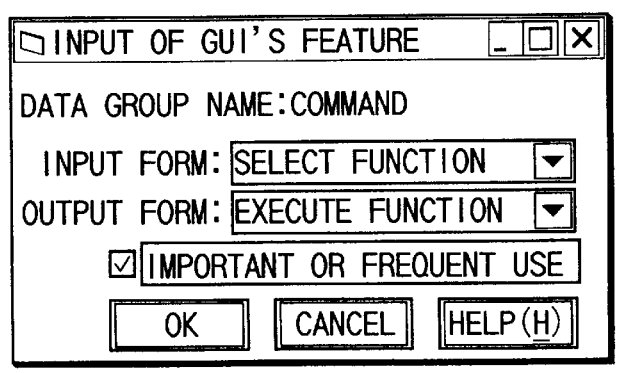

FIGS. 15A to 15C are examples of a definition and input screen at the data input unit 1. FIG. 15A is an example of a display screen that the data input unit 1 offers to the user. With the GUI display screen, an edit screen used to write the names of data items and its hierarchical structure in tree form is provided. In FIG. 15A, when the function of adding an item is selected from the edit menu, this enables a data group or a data item to be added in any position in the tree. FIG. 15A shows a screen representing a data tree. In the figure, an icon 151 indicates a group of data items and an icon 152 indicates a data item. By positioning the mouse cursor (not shown) over the icon 151 or icon 152 and dragging it to any position on the tree, the hierarchical structure of the data can be changed. Moreover, by positioning the mouse cursor over the icon 151 and double-clicking it, a screen allowing the input of a use for a data item and the degree of importance of a data item appears as shown in FIGS. 15B and 15C.

Explanation of a method of writing the above-described data items with the aforementioned register management GUI will be explained using the display screens of FIGS. 15A to 15C.

First, with a display screen as shown in FIG. 15A, the function of adding a group is executed to add "Visit Register", the highest-level data group. Next, "Selection of Function" is added by executing the function of adding a data group. "Input to Register" and "Printing of Results" are added as data items in the "Selection of Function" group by executing the function of adding a data item. Similarly, each of the data groups "Matter of Business", "Position", "Length of Stay", and "Command" and the data items in each group are added.

Next, when the icon of "Selection of Function" group is double-clicked, a screen as shown in FIG. 15B appears. The uses for the input and/or output of all data items included in the "Selection of Function" group are selected from the choices and specified. Because the data items included in the "Selection of Function" group serve as clues in selecting and executing a function, the input format is determined to be "Select a Function" and the output format is determined to be "Execute a Function" and these are selected and inputted. Because the data item "Selection of Function" is not used so often, "Important or Used Frequently" is not checked. Similarly, a use and the degree of importance are inputted for the data items in each of the data groups "Matter of Business", "Position", "Length of Stay", and "Command".

FIG. 15C shows an example of a display screen used to input the degree of importance of a use for the data group "Command". Because the data items in "Command" are used frequently, "Important or Used Frequently" is checked.

With the display screen of FIG. 15A, selecting the function of storing edit results from the file menu enables the name of a data time, hierarchical structure, use, and the degree of importance to be stored in a file. After the names, uses, and the degree of importance for all of the data items have been entered, the storage function is read from the file menu. The readout of the storage function causes the names of the inputted data items, their hierarchical structure, the use for each data item, and the degree of importance of each data item are stored in the input data storage unit 2. FIGS. 16A and 16B show the contents stored in the input data storage unit 2 after the above-described data items have been entered.

After the process at STEP 1401 has been completed, the GUI component selecting system reads the component selection rules, collates these with the uses for the inputted data items, and determines candidates for GUI components (STEP 1402). At this time, it is determined whether or not a plurality of GUI component candidates exist for one inputted data item (STEP 1403). If more than one candidate exists, a single specific candidate is selected on the basis of the feature of the data item, and the selection result is stored in the data storage unit 6 (STEP 1402).

Specifically, when the screen input/output data item entered from the data input unit 1 and its use and the degree of importance of the data item are stored in the input data storage unit 2, the GUI component selecting system sends an instruction to select a component to the collation unit 41 in the component selecting unit 4. The collation unit 41 reads not only the previously defined input data item from the input data storage unit 2 but also the component selection rules used to cause the uses of data items inputted and outputted on a GUI display screen to correspond to GUI components on the basis of the selection rule storage unit 3. FIG. 17 is a table showing an example of the component selection rules stored in the selection rule storage unit 3.

The collation unit 41 compares each row of the definitions of the data groups stored in the input data storage unit 2 with the each row of the component selection rules, and forces a data item to correspond to a GUI component when their keywords coincide. The collation unit 41 first acquires the highest-level group's name "Visit Register" stored in the input data storage unit, allocates all the data items to Frame, a window, using the component selection rules 171 shown in FIG. 17, and sends the result to the decision unit 42. The decision unit 42 determines that a plurality of GUI component candidates do not exist for the single data, writes the data name (column 1801) "Visit Register" and component (column 1802) "Form" in the begin row (row 1908) in the component data storage unit 6 shown in FIG. 18, and writes "P1" in the component name (column 1803) because it is the first data item to which a component has been allocated.

Next, the collation unit 41 acquires the data item "Selection of Function" in the next row stored in the input data storage unit 2, determines on the basis of the component selection rules 1706 and 1707 that the data items belonging to this group correspond to CommandButton or Menu, and sends to the decision unit 42 the determination result together with "Input to Register" (1609) and "Printing of Results" (1610) stored in the input data storage unit 2. After determining that a plurality of GUI component candidates, Menu or CommandButton, exist for a data item belonging to the "Selection of Function" group, the decision unit 42 determines that "Selection of Function" in the input data storage unit 2 is not given importance and that CommandButton occupies more than Menu, in accordance with the component selection rules for CommandButton and Menu stored in the selection rule storage unit 7. The decision unit determines that the data item belonging to the "Selection of Function" group is forced to correspond to the less occupying Menu, because the data is of no importance. Then, the decision unit writes the data name (column 1801) "Selection of Function" and component (column 1802) "Menu" in the second row (row 1809) in the component data storage unit 6 shown in FIG. 18, and writes the component name (column 1803) "P2" because it is the data item to which a component has been allocated secondly.

With the GUI component selecting system of the second embodiment, each component name allocated to a low-order data item in Menu is designed to have the name "High-Order Data Item's Component Name_Number in Ascending Order", making use of the component names allocated to the high-order data items in Menu. Furthermore, the decision unit 42 writes the data name (column 1801) "Input to Register" and component (column 1802) "Menu" in the third row (row 1810) in the component data storage unit 6 shown in FIG. 18, and writes the component name (column 1803) "P2_1" because it is the first component to become a low-order data item in Menu. Then, the decision unit writes the data name (column 1801) "Printing of Results" and component (column 1802) "Menu" in the fourth row (row 1811) in the component data storage unit 6 shown in FIG. 18, and writes the component name (column 1803) "P2_2" because it is the second component to become a low-order data item in Menu.

The collation unit 41 acquires the data item "Matter of Business" stored in the input data storage unit 2, determines on the basis of the component selection rule 1710 that the data item corresponds to ComboBox. When the data item is allocated to ComboBox in accordance with the component selection rule 1715, the data name is allocated to Frame, a group representation of components. The collation unit sends to the decision unit 42 the determination result together with the data item "Visit to Meeting" (1612) and data item "Delivery of Goods" (1613) belonging to this group and stored in the input data storage unit 2 and the information that these data items are allocated to ComboBox. The decision unit 42 writes the data name (column 1801) "Matter of Business" and component (column 1802) "Frame" in the fifth row (row 1812) in the component data storage unit 6 shown in FIG. 18, and writes the component name (column 1803) "P3" because it is the data item to which a component has been allocated thirdly. The decision unit 42 writes not only the data name (column 1801) "Visit to Meeting" and component (column 1802) "ComboBox" in the sixth row (row 1813) of the component data storage unit 6 shown in FIG. 18 but also the data name (column 1801) "Delivery of Goods" and component (column 1802) "ComboBox" in the seventh row (row 1814) in the component data storage unit 6, and writes the component name (column 1803) "P4" because it is the data item to which a component has been allocated fourthly.

Regarding the operation of the component selecting unit 4, the operation of processing from "Position" stored in the eighth row to "More Than 3 Hours" in the fifteenth row in the input data storage unit 2 is carried out as described above, so explanation of it will not be given. The operation of processing the data item "Command" in the sixteenth row stored in the input data storage unit 2 will be explained.

The collation unit 41 acquires the data item "Command" in the sixteenth row stored in the input data storage unit 2, determines on the basis of the component selection rules 1706 and 1707 that the data items belonging to this group correspond to CommandButton or Menu, and sends to the decision unit 42 the determination result together with "Registration" (1623) and "End" (1624) stored in the input data storage unit 2. After determining that a plurality of GUI component candidates, Menu or CommandButton, exist for a data item belonging to the "Command" group, the decision unit 42 determines that "Commmand" in the input data storage unit 2 is given importance and that CommandButton occupies more than Menu, in accordance with the component selection rules for CommandButton and Menu stored in the selection rule storage unit 7. The decision unit determines that the data item belonging to the "Command" group is forced to correspond to the more occupying CommandButton, because the data is important. Then, the decision unit writes the data name (column 1801) "Registration" and component (column 1802) "CommandButton" in the sixteenth row (row 1823) in the component data storage unit 6 shown in FIG. 18, and writes the component name (column 1803) "P9" because it is the data item to which a component has been allocated ninthly. Furthermore, the decision unit 42 writes the data name (column 1801) "End" and component (column 1802) "CommandButton" in the seventeenth row (row 1824) in the component data storage unit 6 shown in FIG. 18, and writes the component name (column 1803) "P10" because it is the data item to which a component has been allocated tenthly.

In a case where the attribute that data item "X" in the n-th row stored in the input data storage unit is important has been given, for example, that is, in a case where the collation unit 41 determines in accordance with, for example, the component selection rule 1705 of FIG. 17 that data item "X" falls under Label, or in a case where the number of components to be selected in accordance with the large or small occupation on the basis of the degree of importance of the screen input/output data items is only one, when storing the component data items about the component determined to be outputted into the component data storage unit 6, the decision unit 42 may write values larger than those of the other components into the Height (1804) and Width (1807) of the row in which the data items are to be stored and make the occupation area on the display screen greater than that of the other display components to display the display component in an emphasized manner.

Similarly, when only one component has to select a data item given an attribute indicating importance, a display component representing the data item may be discriminated from the other display components and displayed in a visually emphasized manner by preparing the attributes of the component data items as the eighth or later row (not shown in FIG. 18) in the component data storage unit 6, causing the decision unit 42 to write, for example, a Gothic (Bold) type font in a character font column, and causing the code generating unit 8 to insert, for example, a code indicating the change of the character attribute, like codes shown below, into the codes generated from the attributes of the component data items.

```
BeginProperty Font
    name      = "Gothic 720"
    underline = -1      'True
    italic    = -1      'True
EndProperty
```

As a result of the above-described operation of the component selecting unit 4, data items are stored into column 1801 to column 1803 in each of row 1808 to row 1824 in the component data storage unit 6.

After the process at STEP 1403 or STEP 1404 has ended in FIG. 14, the GUI component selecting system calculates the display position and display area for each GUI component and stores the calculation results into the component data storage unit 6 (STEP 1405).

Specifically, the component selecting unit 4 sends an instruction to start layout to the layout processing unit 5 after completing the selection of components. The layout processing unit 5 reads data items one after another from the component data storage unit 6, determines the size and position of the GUI component allocated to each data item.

First, the layout processing unit 5 determines the size of each of general components (CommandButton, TextBox, Image, ComboBox, ListBox, OptionButton, CheckButton), component-arranging components (Frame), and windows (Form) in that order. Layout processing is effected, provided that a general component has a height of 400 and a width of 1400. Furthermore, the size of a window is determined taking into account the height of a menu, provided that a menu has a height of 290.

General components included in the component data storage unit 6 include ComboBox used for the data items "Visit to Meeting" and "Delivery of Goods", ComboBox used for the data items "General Affairs Department", "Development Department", and "Trade Department", ComboBox used for the data items "Less Than 1 Hour", "Less Than 2 Hours", and "More Than 3 Hours", CommandButton used for the data item "Registration", and CommandButton used for the data item "End". The layout processing unit 5 writes 400 and 1400 into the Width and Height of each of the aforementioned components in the component data storage unit 6.

The layout processing unit 5 determines the size of a component (Frame) for arranging components.

Components for arranging components included in the component data storage unit 6 are Frames used for the data items "Matter of Business", "Position", and "Length of Stay". Because each of these Frames has one ComboBox of the same shape in it, the three data items have the same size. The layout processing unit 5 sets the size of a component for arranging compoennts to the size obtained by adding a height of 500 and a width of 300 to the size of the display area of all the components included. Because the size of a ComboBox included in these Frames has a height of 400 and a width of 1400, 900 and 1700 are written into the Width and Height of the Frame of each of the three data items, respectively.

Then, the layout processing unit 5 determines the display position of components. After positioning the components except for windows (Forms) and buttons (CommandButtons) in the order of registration, the layout processing unit 5 determines the display position of a button, and finally determines the size and display position of a window. The layout processing unit 5 also makes calculations, provided that the distance between a window frame and a component is 100, and the height distance between components is 300 and the width distance between components is 100.

The layout processing unit 5 sets the display position of the Frame for the first non-window data item "Matter of Business" in the component data storage unit 6 at a position 100 apart from the top left of the window, that is, a height (Top) margin of 100 and a width (Left) margin of 100, and writes them into the component data storage unit 6.

The display position of the ComboBoxs for the next non-window data items "Visit to Meeting" and "Delivery of Goods" has a height (Top) margin of 400, a place 400 apart from the frame of the Frame for "Matter of Business" in the direction of height and a width (Left) margin of 200, a place 200 apart from the frame of the Frame for "Matter of Business" in the direction of width. The layout processing unit 5 determines the height (Top) margin and width (Left) margin of the ComboBox for "Visit to Meeting" and "Delivery of Goods" to be 400 and 200, respectively, and stores them into the component data storage unit 6. The remaining two Frame and ComboBox undergo the same processes as described above, so explanation of them will not be given.

Next, the process of determining the display position of the CommandButton for the remaining non-window data item "Registration" will be explained. The layout processing unit 5 arranges the CommandButtons at the left end of the window from the top vertically.

In the layout processing unit 5, the button data items in the component data storage unit 6 are "Registration" and "End". Regarding the display position of the CommandButton, the position obtained by adding 100 to the widest one of the components whose display position has been determined is determined to be a width (Left) margin. Because the widest components include the Frames for "Matter of Business", "Position", and "Length of Stay" and the sum of Left and Width is 1800 for all the Frames, 1900 is determined to be the width (Left) margin of "Registration" and "End" and is written into the component data storage unit 6. Since "Registration" is at the topmost position in the direction of height, the height (Top) margin is 100, a place 100 apart from the frame of the window. "End" has a height (Top) margin of 500, a place 400 apart from the bottommost position of "Registration". These tow margins are written into the component data storage unit 6.

The layout processing unit 5 further determines the size and display position of the window.

With the layout processing unit of the second embodiment, the display position of a window is the top left of the display screen. The display position of the Frame, a window of "Visit Register", is determined to have a height (Top) margin of 0 and a width (Left) margin of 0. These values are written into the component data storage unit 6. In the layout processing unit of the second embodiment, the size of the window is determined to a size obtained by adding a height of 535 plus the menu's height of 290 and a width of 255 to the size of the display area of all the components included. Because it is found from the locations of the non-window data items and their size in the component data storage unit 6 that the display area of non-widow data items has a height of 3000 and a width of 3300, the size of the window for "Visitor Register" has a width of 3825 and a height of 3525. These values are written into the component data storage unit 6. FIG. 18 shows the contents of the component data storage unit 6 after the operation of the layout processing unit 5.

After having completed the process at STEP 1405 in FIG. 14, the GUI component selecting system reads the rules used to generate codes for the GUI builder from the generation rule storage unit 7, converts the data items stored in the component data storage unit into screen codes, and stores the screen codes into the screen code storage unit (STEP 1406).

Specifically, after having ended the processing, the layout processing unit 5 sends an instruction to generate screen data codes that the GUI builder 10 can read to the code generating unit 8. The code generating unit 8 not only reads the code generation rules from the generation rule storage unit 7 but also the GUI component data items from the component data storage unit 6 one after another, then generates screen data codes that the GUI builder 10 can read, and writes the generated codes into the screen data storage unit 9. In the second embodiment, the generation rule storage unit 7 stores the generation rules as shown in FIGS. 19A to 19C. Specifically, all the components are written in a format indicated by form 1906 in FIG. 19A. For Form, Label, CommandBox, OptionButton, and CheckButton, the name of a data item is written as Caption. For ComboBox and ListBox, the structure of a menu name is written in a format indicated by form 1917 in FIG. 19B. For Menu, the structure of a menu name is written in a format indicated by form 1921 in FIG. 19C. In the second embodiment, screen data codes are generated in this order: Form, components except for Form and Menu, Menu, and the choices of ComboBox and ListBox.

The first data item that the code generating unit 8 reads from the component data storage unit 6 is the Form "Visit Register". According to the generation rules, it is converted into the codes from the first row to the sixth row in the generated codes shown in FIG. 19A. The code generating unit 8 generates codes as described above and writes the codes into the screen data storage unit 9 in sequence. FIG. 20 shows an example of the data items of "Visit Register" stored in the screen data storage unit 9.

Figure 21:
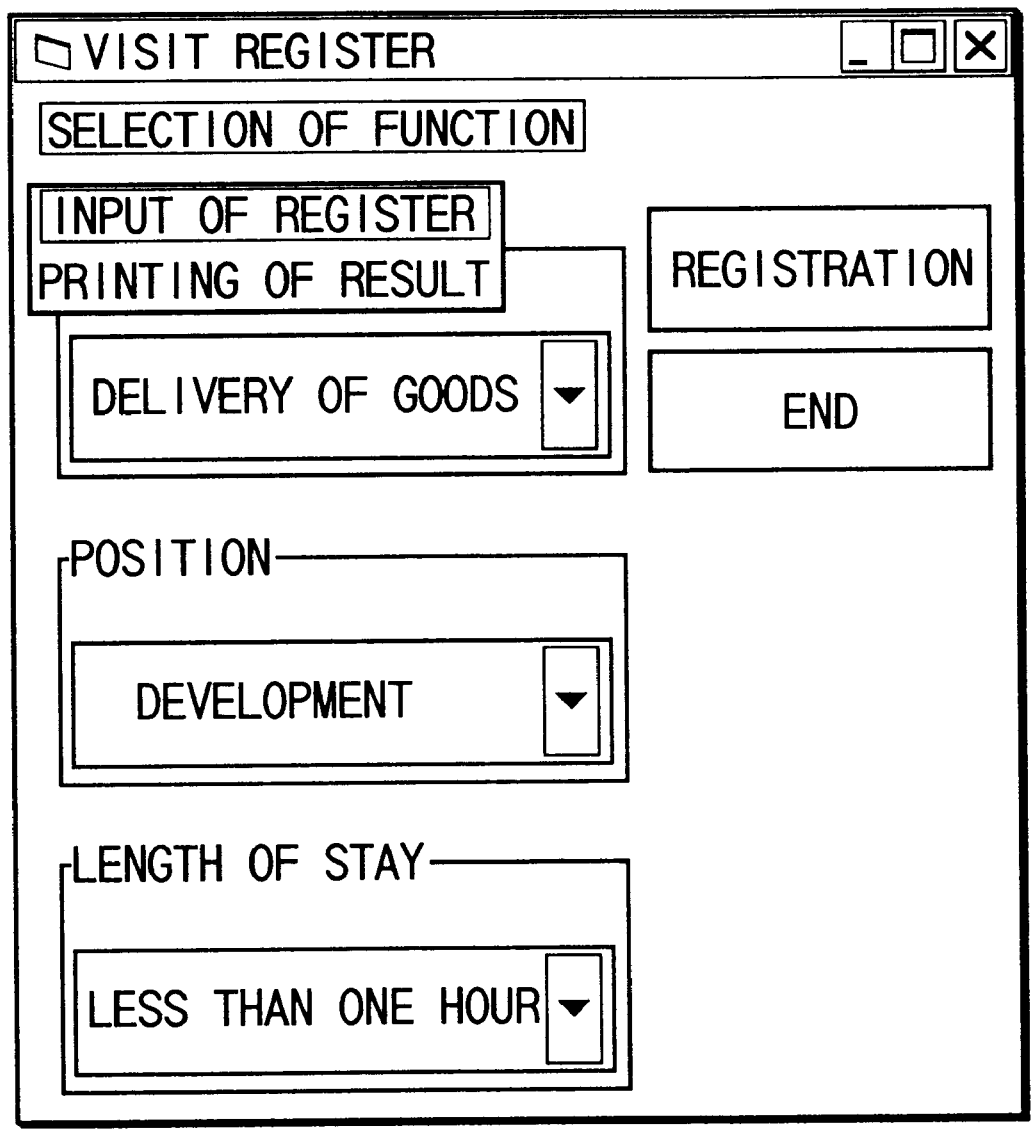
FIG. 21 shows a created screen to help explain the second embodiment of the present invention.

After completing the process at STEP 1406 in FIG. 14, the GUI component selecting system sends the screen data items stored in the screen data storage unit 9 to the GUI builder 10, which displays a GUI screen created on the basis of the screen data items (STEP 1407). Specifically, the GUI builder 10 reads the data from the screen data storage unit 9, and displays a GUI screen as shown in FIG. 21.

With the second embodiment, writing the name and use of screen input/output data items handled by GUI in a specific format enables a GUI component to be selected automatically and a data item in a format editable by the GUI builder to be generated. Therefore, data items for the same use are selected as the same GUI component, which realizes GUI consistent in operation. For data items for the same use, GUI can be built which emphasizes important data items and simplifies less important data items, taking into account the degree of importance, the frequency of use, the probability of modification. Furthermore, before the design of GUI interactive screens, a use for screen input/output data items dealt with by GUI can be examined, which alleviates a working load on the designer in designing and creating GUI interactive screen excellent in operability and maintainability and provides GUI easy for the computer user to use.

As explained so far in detail, with the present invention, because the data input means defines the names and uses for screen input/output data items dealt with by GUI, the component selecting means selects a GUI component from the uses for data items, the component layout means determines the locations of GUI components, and the code generating means converts information on GUI screens into program codes, this alleviates a working load on the designer in designing and creating GUI interactive screen excellent in operability and maintainability and provides GUI easy for the computer user to use.

Although the above second embodiment shows a case where the component selection unit selects a display component specified to be displayed in the visually emphasized manner when the corresponding screen input/output data item indicates importance, the present invention is not limited to this. Instead, it is possible to select a display component having higher operability for a user is selected.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

I claim:

1. A display component selecting system relating to a user interface, comprising:

inputting means for inputting identification information for identifying functions relating to the user interface and an arbitrary attribute item selected from among a plurality of attribute items that are prepared for each of the functions to specify a display component;

input data storage means for storing the identification information input by the inputting means in association with information on the input attribute item; and selection rule holding means for storing a selection rule for assigning one display component to functions whose information on the input attribute item are common; and component selecting means for collating the information on the attribute item stored in the input data storage means with information on the attribute item stored in the selection rule holding means, and for selecting a display component which has the attribute items of a same predetermined combination as collated information on the attribute items and assigning the selected display component to the identification information.

2. The system according to claim 1, further comprising means for generating layout information used to lay out the display components selected by said selecting means on a display screen.

3. The system according to claim 2, further comprising means for generating screen code information from the layout information generated by said layout information generating means on the basis of a specific screen code generation rule.

4. A display component selecting system relating to a user interface, comprising:

inputting means for inputting identification information for identifying functions relating to the user interface, an arbitrary attribute item selected from among a plurality of attribute items that are prepared for each of the functions, and information indicative of importance of each of the functions;

input data storage means for storing the identification information input by the inputting means in association with information on the input attribute item and the information indicative of importance; and selection rule holding means for storing a selection rule for assigning one display component to functions whose information on the attribute item and an emphasis attribute that indicates whether the display component should be visually emphasized based on the importance are common; and component selecting means for collating the information on the attribute item stored in the input data storage means with information on the attribute item stored in the selection rule holding means and selecting a display component which has the attribute items of a same predetermined combination as the collated information on the attribute items, and for assigning the selected display component to the identification information, and when a plurality of display components are selected, said component selecting means further selecting a suitable display component from the selected display components on the basis of the information on the importance stored in the input data storage means and in view of the emphasis attribute stored in the selection rule holding means, and assigning the suitable display component to the identification information.

5. The system according to claim 4, further comprising means for generating layout information used to lay out the display components selected by said selecting means on a display screen.

6. The system according to claim 5, further comprising means for generating screen code information from the layout information generated by said layout information generating means on the basis of a specific screen code generation rule.

7. A method of selecting one of display components relating to a user interface, comprising:

the inputting step of inputting identification information for identifying functions relating to the user interface, and an arbitrary attribute item selected from among a plurality of attribute items that are prepared for each of the functions to specify a display component;

the input data storage step of storing the identification information input in the inputting step in association with information on the input attribute item; and the selection rule holding step of storing a selection rule for assigning one display component to functions whose information on the input attribute item are common; and the step of collating the information on the attribute item stored in the input data storage step with information on the attribute item stored in the selection rule holding step, and of selecting a display component which has the attribute items of a same predetermined combination as the collated information on the attribute items and assigning the selected display component to the identification information.

8. A method of selecting one of display components relating to a user interface, comprising:

the inputting step of inputting identification information for identifying functions relating to the user interface, an arbitrary attribute item selected from among a plurality of attribute items that are prepared for each of the functions, and information indicative of importance of each of the functions;

the input data storage step of storing the identification information input in the inputting step in association with information on the input attribute item and the information indicative of importance; and the selection rule holding step of storing a selection rule for assigning one display component to functions whose information on the attribute item, and an emphasis attribute that indicates whether the display component should be visually emphasized based on the importance, are common; and the component selecting step of collating the information on the attribute item stored in the input data storage step with information on the attribute item stored in the selection rule holding step and selecting a display component which has the attribute items of a same predetermined combination as the collated information on the attribute items, and of assigning the selected display component to the identification information, and when a plurality of display components are selected, said component selecting step further selecting a suitable display component from the selected display components on the basis of the stored information on the importance and in view of the stored emphasis attribute, and assigning the suitable display component to the identification information.

* * * * *